United States Patent
Li et al.

(10) Patent No.: US 11,355,973 B2
(45) Date of Patent: Jun. 7, 2022

(54) DIRECT CURRENT MOTOR

(71) Applicant: UNIVERSITY OF SHANGHAI FOR SCIENCE AND TECHNOLOGY, Shanghai (CN)

(72) Inventors: Shaolong Li, Shanghai (CN); Aijuan Jin, Shanghai (CN)

(73) Assignee: UNIVERSITY OF SHANGHAI FOR SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 17/056,791

(22) PCT Filed: Nov. 8, 2018

(86) PCT No.: PCT/CN2018/114622
§ 371 (c)(1),
(2) Date: Nov. 19, 2020

(87) PCT Pub. No.: WO2020/073405
PCT Pub. Date: Apr. 16, 2020

(65) Prior Publication Data
US 2021/0210997 A1    Jul. 8, 2021

(30) Foreign Application Priority Data

Oct. 10, 2018  (CN) .......................... 201811177664.X
Oct. 10, 2018  (CN) .......................... 201811177671.X
(Continued)

(51) Int. Cl.
*H02K 1/14*    (2006.01)
*H02K 23/08*   (2006.01)
(Continued)

(52) U.S. Cl.
CPC ................ *H02K 1/14* (2013.01); *H02K 3/28* (2013.01); *H02K 23/06* (2013.01); *H02K 23/18* (2013.01); *H02K 2213/03* (2013.01)

(58) Field of Classification Search
CPC .......... H02K 3/18; H02K 17/00; H02K 23/08; H02K 23/36; H02K 3/28; H02K 2213/03; H02K 1/14; H02K 23/06; H02K 23/18
(Continued)

(56) References Cited

U.S. PATENT DOCUMENTS 397,439 A * 2/1889 Patten .................... H02K 23/40
                                                     310/40 R
527,776 A * 10/1894 Daniels .................. H02K 23/40
                                                     310/40 R
(Continued)

FOREIGN PATENT DOCUMENTS

CN       101064462 A    10/2007
CN       202121398 U     1/2012
(Continued)

OTHER PUBLICATIONS

International Search Report in PCT/CN2018/114622, issued by ISA, dated Jul. 11, 2019.
(Continued)

*Primary Examiner* — Burton S Mullins
(74) *Attorney, Agent, or Firm* — Zhu Lehnhoff LLP

(57) ABSTRACT

The present invention provides a direct current motor, including: a casing; m pairs of brushes fixed within the casing; a stator provided within the casing, including m main poles corresponding to the m pairs of brushes, and n field winding parts; and a rotor provided within the stator, wherein each pair of main poles includes an S-polarity main pole and an N-polarity main pole, two neighboring main poles are different in polarity, the two brushes in each pair
(Continued)

of brushes are arranged at neighboring positions, each pair of brushes includes an S-pole corresponding brush corresponding to the S-polarity main pole, and an N-pole corresponding brush corresponding to the N-polarity main pole, each field winding part includes m field winding units corresponding to the m pairs of main poles, respectively, each field winding unit is made up of field coils formed by winding an insulated conductor strip, which is made of a metal wire coated with an insulating layer, around one pair of main poles corresponding to each other, and m is a positive integer not less than 2, and n is 1 or 2.

7 Claims, 23 Drawing Sheets

(30) Foreign Application Priority Data

| Oct. 10, 2018 | (CN) | 201811177672.4 |
| Oct. 10, 2018 | (CN) | 201811177673.9 |
| Oct. 10, 2018 | (CN) | 201811178581.2 |

(51) Int. Cl.
 *H02K 3/28* (2006.01)
 *H02K 23/06* (2006.01)
 *H02K 23/18* (2006.01)

(58) Field of Classification Search
 USPC .......... 290/45; 310/127, 130, 133, 138, 177, 310/180, 184, 185, 195, 198, 203–207, 310/233; 318/246, 527
 See application file for complete search history.

(56) References Cited

U.S. PATENT DOCUMENTS

| 3,348,111 A | * | 10/1967 | Woehler | H02K 3/18 |
| | | | | 318/252 |
| 5,742,111 A | * | 4/1998 | Reed | H01R 39/04 |
| | | | | 310/227 |
| 8,525,382 B2 | * | 9/2013 | Li | H02K 27/04 |
| | | | | 310/158 |
| 10,622,876 B2 | * | 4/2020 | Jin | H02K 13/10 |
| 2010/0156229 A1 | * | 6/2010 | Liu | H02K 23/40 |
| | | | | 310/158 |

FOREIGN PATENT DOCUMENTS

| CN | 104158376 A | | 11/2014 | |
| GB | 1061184 | * | 3/1967 | H02K 23/08 |
| GB | 1213526 | * | 11/1970 | H02P 7/00 |
| JP | 2013013267 A | | 1/2013 | |
| WO | 2005109611 A | | 11/2005 | |

OTHER PUBLICATIONS

Written Opinion of the International Search Report in PCT/CN2018/114622, issued by ISA, dated Jul. 11, 2019.

* cited by examiner

DIRECT CURRENT MOTOR

TECHNICAL FIELD

The present invention belongs to the field of motors, and particularly relates to a direct current motor.

BACKGROUND

Direct current motors are classified into series wound direct current motors, shunt wound direct current motors, series-shunt wound direct current motors, shunt-series wound direct current motors and separately excited direct current motors, based on the excitation.

In the case of a series wound direct current motor, the field winding is connected in series to the armature winding, and the torque of the motor is directly proportional to the square of the current. The series wound direct current motor has the advantages of high speed, large starting torque, small size and light weight, and is less likely to have the problem of locked-rotor and is operable with a voltage in a wide range. Moreover, the speed of the motor can be regulated by adjusting the voltage. Therefore, the series wound direct current motor can meet the demands of electric vehicles for quick start, acceleration, gradeability, frequent start/stop, etc., and thus is superior for applications in driving of heavy-load vehicles such as electric trucks, railcars, tourist cars, trucks and ships.

In the case of a shunt wound direct current motor, the field winding is connected in parallel to the armature winding, and the field winding and the armature winding are exposed to the same power supply. The shunt wound direct current motor has the advantages of good performance in speed regulation, large starting torque, and high overload capacity, and is widely applied to rolling mills, electric locomotives, spindle transmission systems of large-size machine tools, and ships.

A series-shunt wound direct current motor is a compound wound direct current motor, and comprises two sets of field windings, namely a series field winding and a shunt field winding. In the series-shunt wound direct current motor, the armature winding is connected in series to the series field winding and then connected in parallel to the shunt field winding. When the magnetic field produced by the shunt field winding is in the same direction with and assists the magnetic field produced by the series field winding, the motor is a cumulative compound direct current motor. The cumulative compound direct current motor integrates the advantages of both the series wound direct current motor and the shunt wound direct current motor, and it has a large starting torque when operates at low speed and is also prevented from the runaway problem when operates under light load, so that it is particularly suitable for the operation condition of cranes, i.e., heavy-load high-torque starting, as it can operate at blow speed operation under heavy load and operate at high speed under light load, thereby ensuring the safety and efficiency of operation. Therefore, the cumulative compound direct current motor is also superior for applications in driving of heavy-load vehicles such as electric trucks, railcars, tourist cars, trucks and ships.

A shunt-series wound direct current motor is a compound wound direct current motor, and comprises two sets of field windings, namely a shunt field winding and a series field winding. In the shunt-series wound direct current motor, the armature winding is connected in parallel to the shunt field winding and then connected in series to the series field winding. When the magnetic field produced by the shunt field winding is in the same direction with and assists the magnetic field produced by the series field winding, the motor is a cumulative compound direct current motor. The cumulative compound direct current motor integrates the advantages of both the series wound direct current motor and the shunt wound direct current motor, and it has a large starting torque when operates at low speed and is also prevented from the runaway problem when operates under light load, so that it is particularly suitable for the operation condition of cranes, i.e., heavy-load high-torque starting, as it can operate at blow speed operation under heavy load and operate at high speed under light load, thereby ensuring the safety and efficiency of operation. Therefore, the cumulative compound direct current motor is also superior for applications in driving of heavy-load vehicles such as electric trucks, railcars, tourist cars, trucks and ships.

In the case of a separately excited direct current motor, the field winding and the armature winding are separately energized from two power supplies, and the field current is separately provided, independent of the armature current. Therefore, the separately excited direct current motor is convenient to control, and its speed regulation, positive inversion, and energy feedback can be easily achieved. The separately excited direct current motor is widely applied to electric forklift trucks, electric vehicles, electric tourist cars, electric tractors, spindle transmission systems of large-size machine tools, ships, etc.

A direct current motor is generally used with a chopper serving as a speed control device of the direct current motor. In order to ensure the reliability of the system, the chopper typically has a maximum output current which is 2 to 3 times of the rated current of the motor. A high-power high-performance direct current motor, especially a low-voltage high-current direct current motor, needs a chopper with a large continuous working current, however, the related technologies and products are controlled and monopolized by some countries and companies, resulting in the high price. Besides, commercially available choppers for high-performance motors can only provide an output current no more than one thousand amperes, which seriously restricts and influences the development of low-voltage high-current direct current motors.

The output voltage and output current of the chopper can be varied by switching a transistor power switch through pulse width modulation, and the amplitude of the ripple of the current is inversely proportional to the switching frequency of the transistor power switch, while the switching frequency of the transistor power switch is directly proportional to the switching loss (or temperature rise and failure rate). However, the ripple of the output torque of the motor is directly proportional to the square of the ripple of the current. Therefore, the switching frequency should be increased to reduce the ripple of the output torque or the ripple of the current of the motor, while the switching frequency also should be reduced to reduce the switching loss. This conflict influences the development of the speed control device of the high-power high-performance direct current motor, resulting in difficulties in application of the direct current motor to CNC machine tools or another device which imposes great restriction on torque ripple.

A direct current motor used for national defense equipment is particularly sensitive to vibration and electromagnetic interference due to the stealth feature, that is to say, the restriction on the ripple of the output torque or the ripple of the current of the motor are particularly strict. However, the conventional series wound direct current motor currently used for high-power national defense electric equipment can hardly resist the increasingly developed detection technology.

For above reasons, development of the high-power direct current motor is restricted and influenced, which further influences the construction of economics and national defense.

SUMMARY OF THE INVENTION

The present invention has been made to solve the aforementioned problems, and an object of the present invention is to provide a direct current motor.

In order to achieve the object, the present invention adopts the following technical scheme:

provided is a direct current motor, connected to at least one direct current power supply, characterized by comprising: a casing; m pairs of brushes fixed within the casing; a stator provided within the casing, including m main poles corresponding to the m pairs of brushes, and n field winding parts; and a rotor provided within the stator, including a plurality of armature windings in a predetermined connection, wherein each pair of main poles includes an S-polarity main pole and an N-polarity main pole, two neighboring main poles are different in polarity, the two brushes in each pair of brushes are arranged at neighboring positions, each pair of brushes includes an S-pole corresponding brush corresponding to the S-polarity main pole, and an N-pole corresponding brush corresponding to the N-polarity main pole, each field winding part includes m field winding units corresponding to the m pairs of main poles, respectively, each field winding unit is made up of field coils formed by winding an insulated conductor strip, which is made of a metal wire coated with an insulating layer, around one pair of main poles corresponding to each other, and m is a positive integer not less than 2, and n is 1 or 2.

The direct current motor provided by the present invention may be further characterized in that, the direct current motor is connected to m pairs of power output terminals provided by the at least one direct current power supply, when n is 1, the insulated conductor strip of each field winding unit has one end and the other end, all the m one ends of the insulated conductor strips are electrically connected to all the m S-pole corresponding brushes in the brushes; or, all the m one ends of the insulated conductor strips are electrically connected to all the m N-pole corresponding brushes in the brushes, all the m the other ends of the insulated conductor strips form m first wiring terminals, lead-out terminals of the m brushes, which are not connected with the m one ends, form m second wiring terminals, the m first wiring terminals and the m second wiring terminals correspondingly form m pairs of external wiring terminals, respectively, and the m pairs of external wiring terminals are for connection to the m pairs of power output terminals in one-to-one correspondence.

The direct current motor provided by the present invention may be further characterized in that, the direct current motor is connected to m pairs of power output terminals provided by the at least one direct current power supply, when n is 1, the insulated conductor strip of each field winding unit has one end and the other end, all the m one ends of the insulated conductor strips are electrically connected to all the m S-pole corresponding brushes in the brushes to form m first wiring terminals, while all the m the other ends of the insulated conductor strips are electrically connected to all the m N-pole corresponding brushes in the brushes to form m second wiring terminals; or, all the m one ends of the insulated conductor strips are electrically connected to all the m N-pole corresponding brushes in the brushes to form m first wiring terminals, while all the m the other ends of the insulated conductor strips are electrically connected to all the m S-pole corresponding brushes in the brushes to form m second wiring terminals, the m first wiring terminals and the m second wiring terminals correspondingly form m pairs of external wiring terminals, respectively, and the m pairs of external wiring terminals are for connection to the m pairs of power output terminals in one-to-one correspondence.

The direct current motor provided by the present invention may be further characterized in that, the field coils on all the main poles have the same number of turns, and the spatial positions of each pair of main poles correspond to those of one pair of brushes corresponding to each other.

The direct current motor provided by the present invention may be further characterized in that, the direct current motor is connected to m pairs of power output terminals provided by the at least one direct current power supply, when n is 2, the stator includes a series field winding part and a shunt field winding part, the series field winding part includes m series field winding units, the shunt field winding part includes m shunt field winding units, each series field winding unit is made up of series field coils made with the insulated conductor strip, each shunt field winding unit is made up of shunt field coils made with the insulated conductor strip, the insulated conductor strip of each series field winding unit has one series end and the other series end, the insulated conductor strip of each shunt field winding unit has one shunt end and the other shunt end, all the m one series ends of the insulated conductor strips of the series field winding units are electrically connected to all the m S-pole corresponding brushes in the brushes; or, all the m one series ends of the insulated conductor strips of the series field winding units are electrically connected to all the m N-pole corresponding brushes in the brushes, all the m the other series ends of the insulated conductor strips of the series field winding units form m first wiring terminals, lead-out terminals of the m brushes, which are not connected with the m one series ends, form m second wiring terminals, the m first wiring terminals and the m second wiring terminals correspondingly form m pairs of external wiring terminals, respectively, the m pairs of external wiring terminals are for connection to the m pairs of power output terminals in one-to-one correspondence, all the m one shunt ends of the insulated conductor strips of the shunt field winding units are connected to the m first wiring terminals in one-to-one correspondence, while all the m the other shunt ends of the insulated conductor strips of the shunt field winding units are connected to the m second wiring terminals in one-to-one correspondence; or, all the m the other shunt ends of the insulated conductor strips of the shunt field winding units are connected to the m first wiring terminals in one-to-one correspondence, while all the m one shunt ends of the insulated conductor strips of the shunt field winding units are connected to the m second wiring terminals in one-to-one correspondence.

The direct current motor provided by the present invention may be further characterized in that, the direct current motor is connected to m pairs of power output terminals provided by the at least one direct current power supply, when n is 2, the stator includes a series field winding part and a shunt field winding part, the series field winding part includes m series field winding units, the shunt field winding part includes m shunt field winding units, each series field winding unit is made up of series field coils made with the insulated conductor strip, each shunt field winding unit is made up of shunt field coils made with the insulated conductor strip, the insulated conductor strip of each series field winding unit has one series end and the other series end, the insulated conductor strip of each shunt field winding unit has one shunt end and the other shunt end, all the m one shunt ends of the insulated conductor strips of the shunt field winding units are electrically connected to all the m S-pole corresponding brushes in the brushes to form m first electrical connection points, while all the m the other ends of the insulated conductor strips of the shunt field winding units are electrically connected to all the m N-pole corresponding brushes in the brushes to form m second electrical connection points; or, all the m the other shunt ends of the insulated conductor strips of the shunt field winding units are electrically connected to all the m S-pole corresponding brushes in the brushes to form m first electrical connection points, while all the m one ends of the insulated conductor strips of the shunt field winding units are electrically connected to all the m N-pole corresponding brushes in the brushes to form m second electrical connection points, all the m one series ends of the insulated conductor strips of the series field winding units are correspondingly connected to the m first electrical connection points, respectively, while all the m the other series ends of the insulated conductor strips of the series field winding units form m first wiring terminals; or, all the m the other series ends of the insulated conductor strips of the series field winding units are correspondingly connected to the m first electrical connection points, respectively, while all the m one series ends of the insulated conductor strips of the series field winding units form m first wiring terminals, the m second electrical connection points form m second wiring terminals, the m first wiring terminals and the m second wiring terminals correspondingly form m pairs of external wiring terminals, respectively, and the m pairs of external wiring terminals are for connection to the m pairs of power output terminals in one-to-one correspondence.

The direct current motor provided by the present invention may be further characterized in that, the series field coils of the series field winding units on all the main poles have the same number of turns, the shunt field coils of the shunt field winding units on all the main poles have the same number of turns, the series field coils and the shunt field coils on each main pole have the same current cycling direction, and the spatial positions of each pair of main poles correspond to those of one pair of brushes corresponding to each other.

The direct current motor provided by the present invention may be further characterized in that, the connection of the two series field coils of each series field winding unit is any one of series connection and parallel connection, the connections of the two series field coils of all the series field winding units are identical, the connection of the two shunt field coils of each shunt field winding unit is any one of series connection and parallel connection, and the connections of the two shunt field coils of all the shunt field winding units are identical.

The direct current motor provided by the present invention may be further characterized in that, the number of the direct current power supply is one, and the m pairs of power output terminals are wiring terminals of m power output branches of the direct current power supply, respectively.

The direct current motor provided by the present invention may be further characterized in that, the number of the direct current power supplies is m, and the m pairs of power output terminals are wiring terminals of the m direct current power supplies, respectively.

The direct current motor provided by the present invention may be further characterized in that, the direct current power supply includes at least one first direct current power supply and at least one second direct current power supply, the direct current motor is connected to m pairs of first power output terminals provided by the at least one first direct current power supply and m pairs of second power output terminals provided by the at least one second direct current power supply, when n is 1, the insulated conductor strip of each field winding unit has one end and the other end, two lead-out terminals of each pair of brushes form a first armature wiring terminal and a second armature wiring terminal, respectively, all the m first armature wiring terminals and the m second armature wiring terminals of the brushes correspondingly form m pairs of external armature wiring terminals, respectively, the m pairs of external armature wiring terminals are for connection to the m pairs of first power output terminals in one-to-one correspondence, all the m one ends of the insulated conductor strips form m first field wiring terminals, and all the m the other ends of the insulated conductor strips form m second field wiring terminals, the m first field wiring terminals and the m second field wiring terminals correspondingly form m pairs of external field wiring terminals, respectively, and the m pairs of external field wiring terminals are for connection to the m pairs of second power output terminals in one-to-one correspondence.

The direct current motor provided by the present invention may be further characterized in that, the number of the first direct current power supply is one, and the m pairs of first power output terminals are wiring terminals of m power output branches of the first direct current power supply, respectively; or the number of the first direct current power supplies is m, and the m pairs of first power output terminals are wiring terminals of the m first direct current power supplies, respectively.

The direct current motor provided by the present invention may be further characterized in that, the number of the second direct current power supply is one, and the m pairs of second power output terminals are wiring terminals of m power output branches of the second direct current power supply, respectively; or the number of the second direct current power supplies is m, and the m pairs of second power output terminals are wiring terminals of the m second direct current power supplies, respectively.

The direct current motor provided by the present invention may be further characterized in that, the field coils on all the main poles have the same number of turns.

The direct current motor provided by the present invention may be further characterized in that, the connection of the two field coils of each field winding unit is any one of series connection and parallel connection, and the connections of the two shunt field coils of all the shunt field winding units are identical.

The direct current motor provided by the present invention may be further characterized in that, each brush includes a brush body, or at least two separately formed brush bodies which are arranged along the axial direction of the motor and electrically connected in parallel.

The direct current motor provided by the present invention may be further characterized in that, the insulated conductor strip is any one of an enameled wire and an insulated copper conductor strip.

The direct current motor provided by the present invention may be further characterized in that, the predetermined connection is any one of simplex lap connection, multiplex lap connection, and multiplex wave connection.

The direct current motor provided by the present invention may be further characterized in that, the direct current power supply is any one of a chopper, a battery, and a commutating power supply.

Function and Effect of the Invention

According to the direct current motor provided by the present invention, each pair of main poles includes an S-polarity main pole and an N-polarity main pole, two neighboring main poles are different in polarity, the two brushes in each pair of brushes are arranged at neighboring positions, each pair of brushes includes an S-pole corresponding brush corresponding to the S-polarity main pole, and an N-pole corresponding brush corresponding to the N-polarity main pole, each field winding part includes m field winding units corresponding to the m pairs of main poles, respectively, each field winding unit is made up of field coils formed by winding an insulated conductor strip, which is made of a metal wire coated with an insulating layer, around one pair of main poles corresponding to each other, and m is a positive integer not less than 2, so that each field winding unit is structurally independent and can operate independently, that is: the current in each field winding unit is independent, which allows the current in each field winding unit to be similar to and staggered by 1/m of the switching cycle from one another, so as to reduce both the ripple and the ripple coefficient of the sum of the currents of the m field winding units, i.e. the field current of the motor. Therefore, on the one hand, the motor suffers less electromagnetic interference; on the other hand, the ripple and the ripple coefficient of the main magnetic field formed by the m field winding units are both reduced, so that the ripple and the ripple coefficient of the output torque of the motor are reduced, thus reducing the ripple and the ripple coefficient of the output speed of the motor as well as the vibration and noise of the motor.

Moreover, since the current of each field winding unit is independent, when some field winding units break down, other field winding units can still work normally, and the strength of the magnetic field of corresponding main poles keeps generally constant, so that a large output torque is ensured, and the phenomenon that the conventional direct current motor may suddenly run out of control when a field winding breaks down is prevented, thereby improving the reliability and safety of the system.

Further, since the current of each field winding unit is independent and is 1/m of the current of the field winding part, when the field winding part has a large rated current, the current of each field winding unit can be correspondingly reduced as long as m is large enough, so that the requirements on the contact resistance and insulation of wires and connectors connected to the field winding units are lowered, thereby reducing the cost and difficulties in the production and manufacturing, and improving the cost performance, reliability and safety of the system.

In summary, the direct current motor of this embodiment is simple in structure, uses short connecting lines, and is produced by simple procedures, so that it is easy to manufacture and convenient to maintain, and costs less in both production and maintenance, thus having the advantages of reasonable and simple structure design, high reliability, and high safety. Therefore, the direct current motor is not only applicable to heavy-load electric equipment such as electric vehicles, electric trucks, railcars, tourist cars, trucks and ships, but also applicable to high-performance electric equipment such as numerical control machines and submarines.

DETAILED DESCRIPTION OF THE PREFERRED EMBODIMENTS

The embodiments of the present invention will be described below in connection with the accompanying drawings.

Embodiment 1

Figure 1:
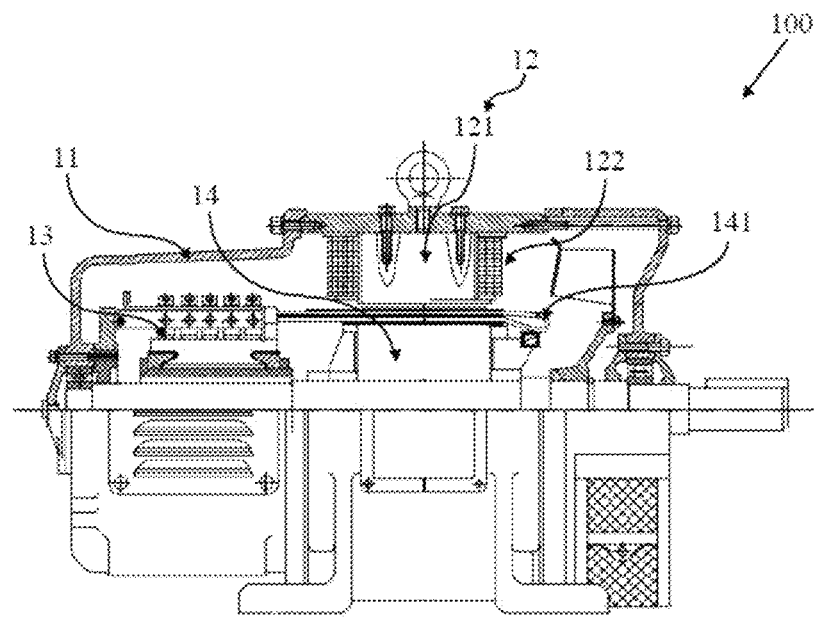
FIG. 1 is a schematic diagram showing the longitudinal section structure of a direct current motor of an embodiment of the present invention.
Figure 2:
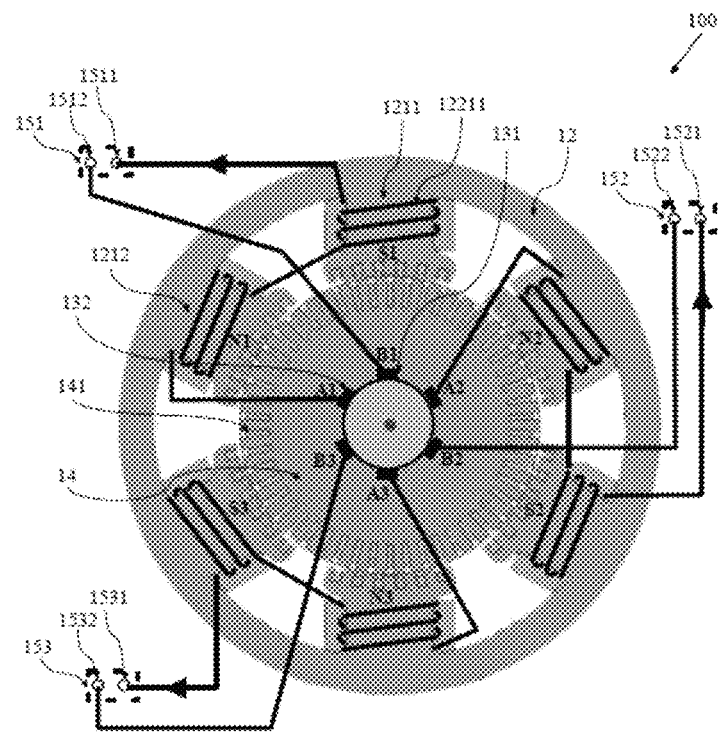
FIG. 2 is a schematic diagram showing circuit connection in the transversal section structure of a series wound direct current motor of Embodiment 1 of the present invention.
Figure 3:
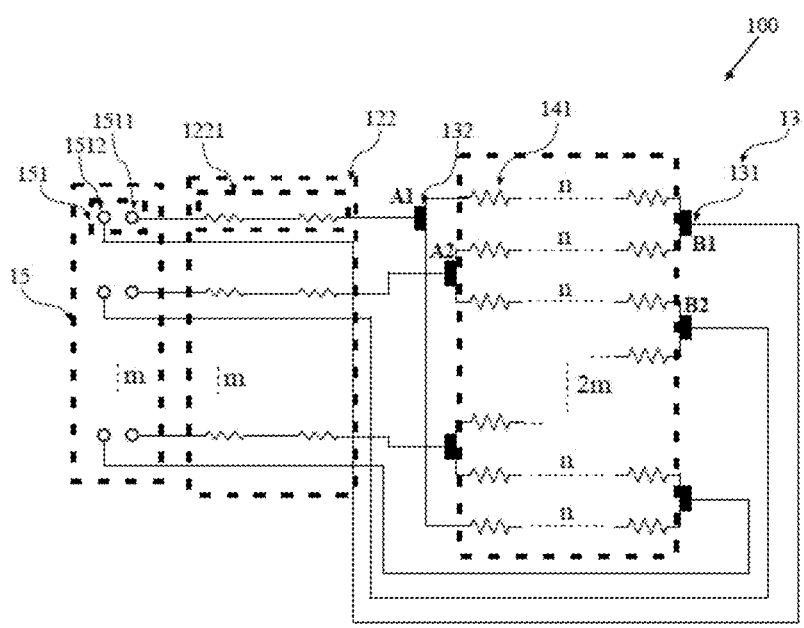
FIG. 3 is a schematic diagram showing circuit connection of armature windings and field windings of a series wound direct current motor of the present invention.
Figure 4:
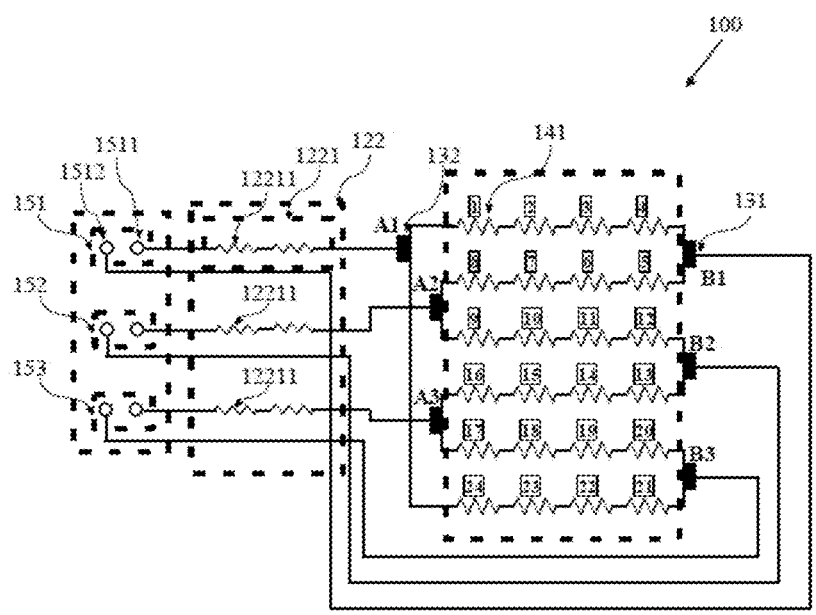
FIG. 4 is a schematic diagram showing circuit connection of armature windings and field windings of the series wound direct current motor of Embodiment 1 of the present invention.
Figure 5:
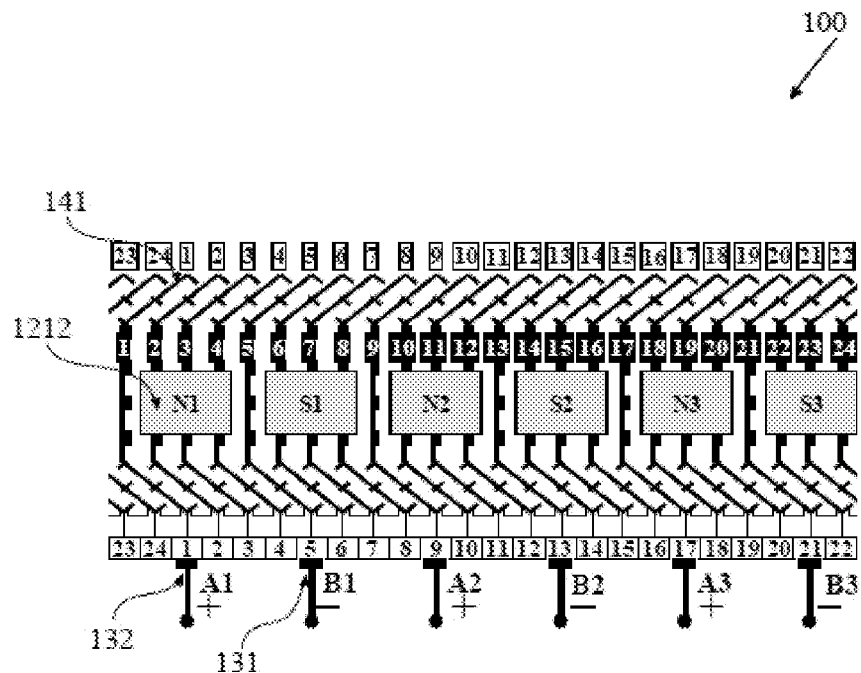
FIG. 5 is an exploded diagram showing simplex lap connection of armature windings of the series wound direct current motor of Embodiment 1 of the present invention.

FIG. 1 is a schematic diagram showing the longitudinal section structure of a direct current motor of an embodiment of the present invention; FIG. 2 is a schematic diagram showing circuit connection in the transversal section structure of a series wound direct current motor of Embodiment 1 of the present invention; FIG. 3 is a schematic diagram showing circuit connection of armature windings and field windings of a series wound direct current motor of the present invention; FIG. 4 is a schematic diagram showing circuit connection of armature windings and field windings of the series wound direct current motor of Embodiment 1 of the present invention; and FIG. 5 is an exploded diagram showing simplex lap connection of armature windings of the series wound direct current motor of Embodiment 1 of the present invention.

In this embodiment, a direct current motor 100 is a series wound direct current motor which is connected to m pairs of power output terminals provided by at least one direct current power supply (not shown), and has a rated input current. when the number of the direct current power supply is one, the m pairs of power output terminals are wiring terminals of m power output branches of the direct current power supply, respectively; and when the number of the direct current power supplies is m, the m pairs of power output terminals are wiring terminals of the m direct current power supplies, respectively. The direct current power supply is any one of a chopper, a battery, and a commutating power supply, and in this embodiment, the direct current power supply is a chopper having a switching frequency of 1 kHz.

As shown in FIGS. 1 and 2, the direct current motor 100 includes a casing 11, a stator 12, brushes 13, a rotor 14, and a junction box (not shown). As shown in FIG. 3, m pairs of brushes are provided according to the value of the rated input current. As shown in FIGS. 4 and 5, m is set to be 3 in this embodiment. If the maximum output current of one pair of power output terminals is $I_1$, and the rated input current of the direct current motor is $I_{max}$, then the count of pairs of the brushes, i.e. m, satisfies the following condition: $m > I_{max}/I_1$.

As shown in FIGS. 1 and 2, the stator 12 is provided within the casing 11, and includes three pairs (i.e. six in total) of main poles 121, and a field winding part 122.

As shown in FIG. 2, each pair of main poles 121 includes an S-polarity main pole 1211 and an N-polarity main pole 1212. In all the main poles 121, two neighboring main poles 121 are opposite in polarity.

As shown in FIGS. 1 to 3, the field winding part 122 includes three field winding units 1221 corresponding to the three pairs of main poles 121, respectively. Each field winding unit 1221 is made up of field coils 12211 formed by winding an insulated conductor strip, which is made of a metal wire coated with an insulating layer, around one pair of main poles 121 corresponding to each other. The insulated conductor strip is any one of an enameled wire, and an insulated copper conductor strip, and in this embodiment, the insulated conductor strip is an enameled wire. In this embodiment, the field coils 12211 on all the main poles 121 have the same number of turns, so that the motor can produce an uniform magnetic field during normal operation, and the torque is constant.

The insulated conductor strip of each field winding unit 1221 has one end and the other end, which are distinguished according to a preset current direction of the field coils 12211. The S-polarity main pole 1211 and the N-polarity main pole 1212 of each pair of main poles 121 correspond to the winding direction of the field coils 12211 and the preset current direction of the field coils 12211. The field coils 12211 of two neighboring main poles 121 have opposite current cycling directions.

The connection of the two field coils 12211 of each field winding unit 1221 is any one of series connection and parallel connection, and the connections of the two field coils 12211 of all the field winding units 1221 are identical. In this embodiment, the connection of the two field coils 12211 is series connection.

As shown in FIGS. 1 and 2, the three pairs (i.e. six in total) of brushes 13 are fixed within the casing 11, and each pair of brushes 13 includes an S-pole corresponding brush 131 corresponding to the S-polarity main pole 1211, and an N-pole corresponding brush 132 corresponding to the N-polarity main pole 1212. The two brushes 13 in each pair of brushes 13 are arranged at neighboring positions; and the spatial positions of each pair of brushes 13 correspond to those of each pair of main poles 121 corresponding to each other, so that the strength of the magnetic field in the armature windings can be kept at maximum when a failure happens, thereby producing a maximum torque.

The brushes 13 are any one of narrow brushes and wide brushes, and in this embodiment, the brushes 13 are narrow brushes. Each brush 13 includes a brush body, or at least two separately formed brush bodies which are arranged along the axial direction of the motor and electrically connected in parallel; and when the brush 13 includes at least two brush bodies, the actual contact area of each brush with the commutator is increased, thereby improving the commutation ability of the brush. As shown in FIG. 1, the brush 13 includes one brush body in this embodiment.

As shown in FIG. 3, all the m one ends of the insulated conductor strips of the field winding units 1221 are electrically connected to all the m N-pole corresponding brushes 132 in the brushes 13, all the m the other ends of the insulated conductor strips of the field winding units 1221 form m first wiring terminals 1511, lead-out terminals of the m S-pole corresponding brushes 131, which are not connected with the one ends of the insulated conductor strips of the field winding units 1221, form m second wiring terminals 1512, and the m first wiring terminals 1511 and the m second wiring terminals 1512 correspondingly form m pairs of external wiring terminals (i.e. m wiring units), respectively, and the m pairs of external wiring terminals are for connection to the m pairs of power output terminals in one-to-one correspondence. Of course, according to the need, it is also possible that all the m one ends of the insulated conductor strips of the field winding units 1221 are electrically connected to all the m S-pole corresponding brush-pole corresponding brushes 131 in the brushes 13, and lead-out terminals of the m N-pole corresponding brushes 132, which are not connected with the one ends of the insulated conductor strips of the field winding units 1221, form m second wiring terminals 1512.

In this embodiment, as shown in FIGS. 2 and 4, the first wiring terminal 1511 and the second wiring terminal 1512 correspondingly form a pair of external wiring terminals 151, the first wiring terminal 1521 and the second wiring terminal 1522 correspondingly form a pair of external wiring terminals 152, the first wiring terminal 1531 and the second wiring terminal 1532 correspondingly form a pair of wiring terminals 153, and the three pairs of external wiring terminals (i.e. the three wiring units) 151, 152 and 153 are for connection to the three pairs of power output terminals in one-to-one correspondence.

As shown in FIGS. 1 and 2, the rotor 14 is provided within the stator 12, and includes a plurality of armature windings 141 in a predetermined connection, and the number of the armature windings 141 is set to be 2m*n. The predetermined connection is any one of simplex lap connection, multiplex lap connection, and multiplex wave connection. In this embodiment, as shown in FIG. 5, the plurality of armature windings 141 are in a simplex lap connection in which two neighboring brushes are connected to one armature winding branch, and each armature winding branch includes n armature windings 141.

The junction box (not shown) is fixed to the casing 11, and as shown in FIGS. 2 and 4, the three pairs of external wiring terminals 151, 152 and 153 are provided in the junction box.

Figure 6:
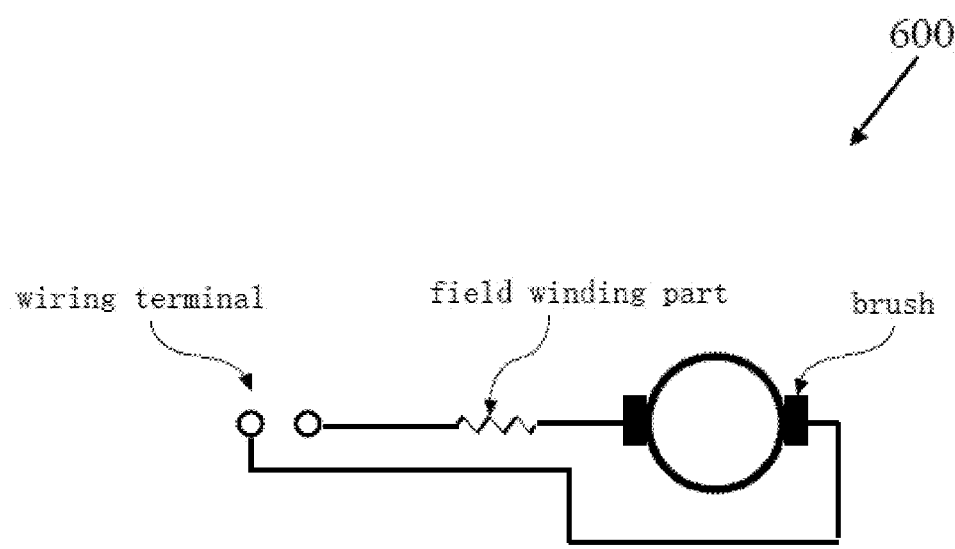
FIG. 6 is a schematic diagram showing circuit connection of a conventional series wound direct current motor.
Figure 7:
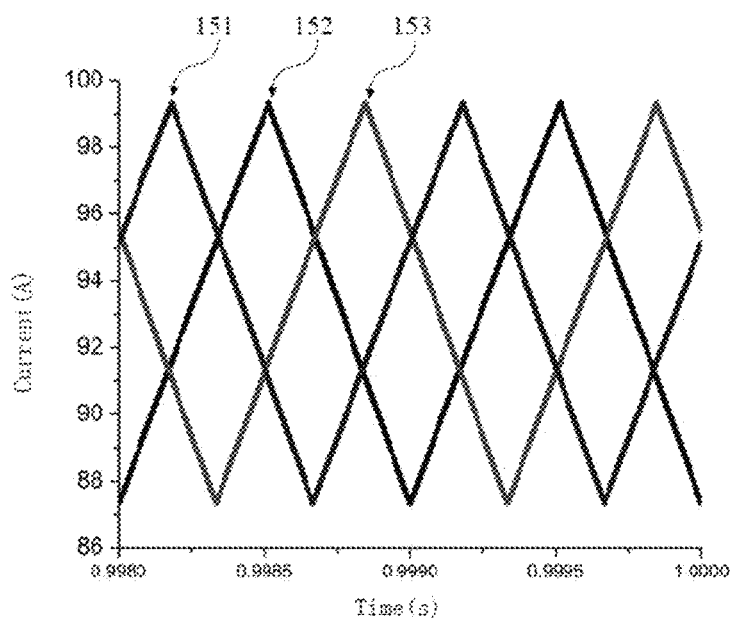
FIG. 7 is a graph showing input current waveforms of three wiring units of the series wound direct current motor of Embodiment 1 of the present invention.
Figure 8:
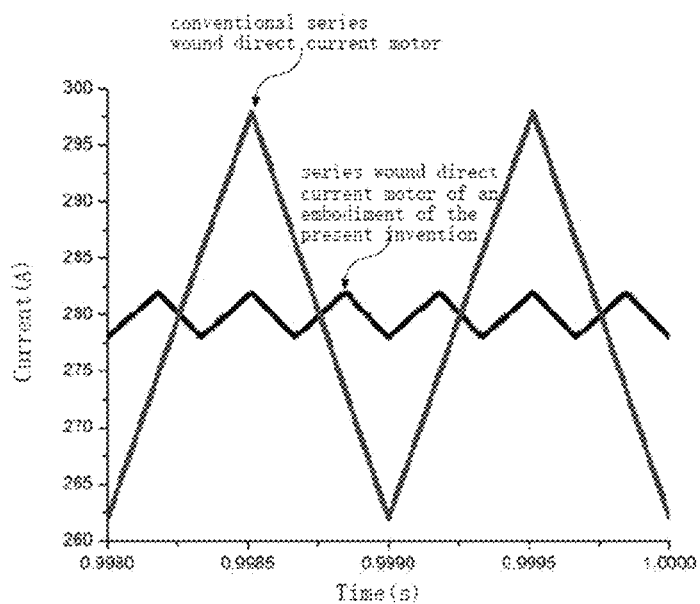
FIG. 8 is a graph comparing the current of the series wound direct current motor of Embodiment 1 of the present invention with that of a conventional series wound direct current motor.
Figure 9:
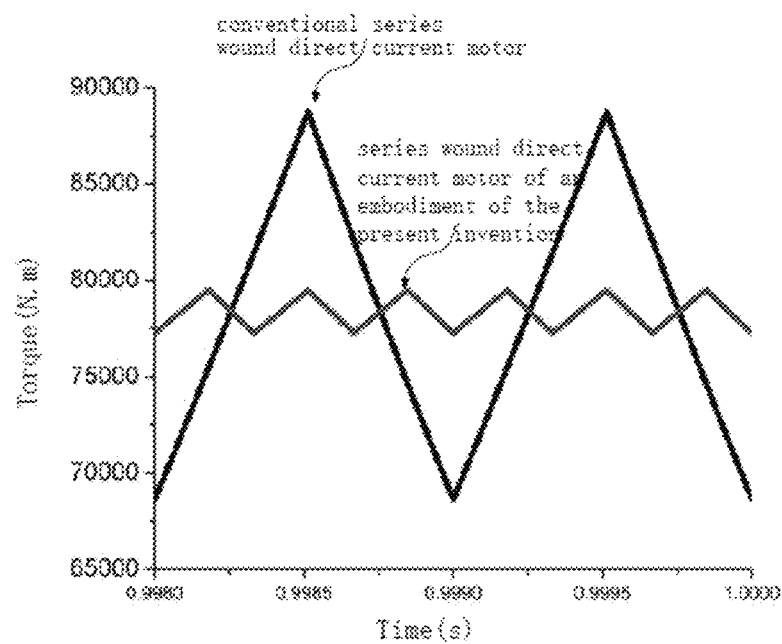
FIG. 9 is a graph comparing the torque of the series wound direct current motor of Embodiment 1 of the present invention with that of a conventional series wound direct current motor.

FIG. 6 is a schematic diagram showing circuit connection of a conventional series wound direct current motor; FIG. 7 is a graph showing input current waveforms of three wiring units of the series wound direct current motor of Embodiment 1 of the present invention; FIG. 8 is a graph comparing the current of the series wound direct current motor of Embodiment 1 of the present invention with that of a conventional series wound direct current motor; and FIG. 9 is a graph comparing the torque of a series wound direct current motor of an embodiment of the present invention with that of a conventional series wound direct current motor.

As shown in FIG. 6, a conventional series wound direct current motor 600 only has one wiring unit, and the wiring unit is correspondingly electrically connected to a pair of power output terminals of a chopper (not shown) having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 7, for the three wiring units 151, 152 and 153 of the series wound direct current motor of this embodiment, the ripples of the input currents are all equal to 99.32−87.36=11.96 amperes, the mean values are all equal to 93.33 amperes, and the ripple coefficients are all equal to 11.96/93.33*100%=12.8%.

As shown in FIG. 8, in the steady state, for the series wound direct current motor of this embodiment, the ripple of the current is equal to 281.96−278.00=3.96 amperes, the mean value is equal to 279.98 amperes, and the ripple coefficient is equal to 3.96/279.98*100%=1.41%. For the conventional series wound direct current motor, the ripple of the current is equal to 297.95−261.99=35.96 amperes, the mean value is equal to 279.98 amperes, and the ripple coefficient is equal to 3.96/279.98*100%=12.8%. Although the mean value of the current of the series wound direct current motor of this embodiment is as same as that of the conventional series wound direct current motor, the ripple and the ripple coefficient of the current of the series wound direct current motor of this embodiment are only 1/9 of those of the conventional series wound direct current motor.

Given that the electromagnetic torque and motion equations of the series wound direct current motor are as follows $$\begin{cases} T_{em} = C_T \Phi I_a = L_{af} I_f I_a & (1) \\ T_{em} - T_{load} = J \dfrac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; $I_a$ is the armature current; $T_{load}$ is the load torque; J is the load moment of inertia, and is a constant; and $\Omega$ is the output angular velocity.

In this embodiment, the input current of the series wound direct current motor is equal to the armature current and also equal to the field current, and the rated input current of the series wound direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ takes value of 1, and in the steady state, as shown in FIG. 9, for the series wound direct current motor of this embodiment, the ripple of the torque is equal to 79503.7−77281.1=2222.6 N·m, the mean value is equal to 78390.9 N·m, and the ripple coefficient is equal to 2.84%. For the conventional series wound direct current motor, the ripple of the torque is equal to 88776.6−68639.9=20136.7 N·m, the mean value is equal to 78497.4 N·m, and the ripple coefficient is equal to 25.65%.

That is to say, although the mean value of the torque of the series wound direct current motor of this embodiment is as same as that of the conventional series wound direct current motor, the ripple and the ripple coefficient of the torque of the series wound direct current motor of this embodiment are only 1/9 of those of the conventional series wound direct current motor, so that the ripple and the ripple coefficient of the output torque of the motor are reduced, and in turn the ripple and the ripple coefficient of the output speed of the motor are reduced, thereby achieving the purposes of reducing electromagnetic interference, vibration and noises of the motor and improving the performance of the series wound direct current motor and electric equipment.

Embodiment 2

Figure 10:
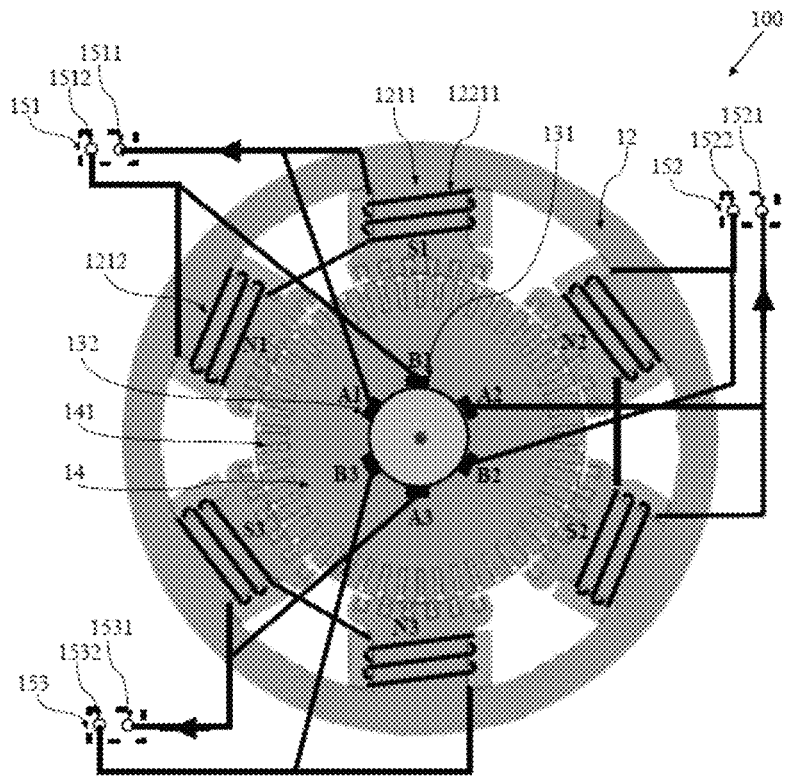
FIG. 10 is a schematic diagram showing circuit connection in the transversal section structure of a shunt wound direct current motor of Embodiment 2 of the present invention.
Figure 11:
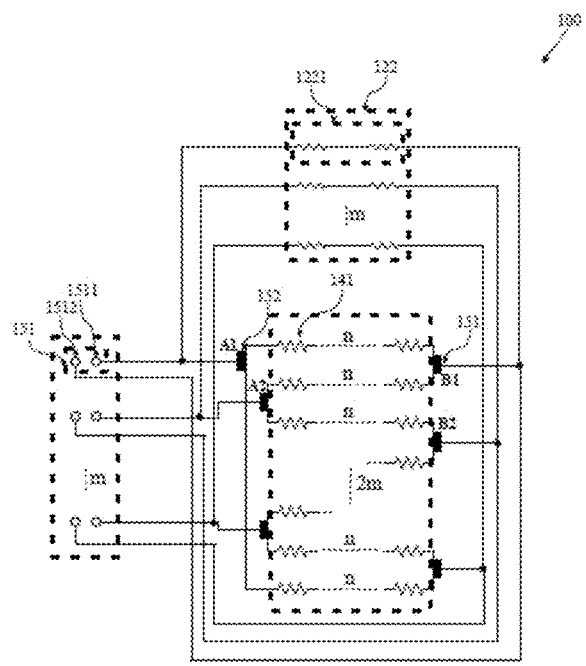
FIG. 11 is a schematic diagram showing circuit connection of armature windings and field windings of a shunt wound direct current motor of the present invention.
Figure 12:
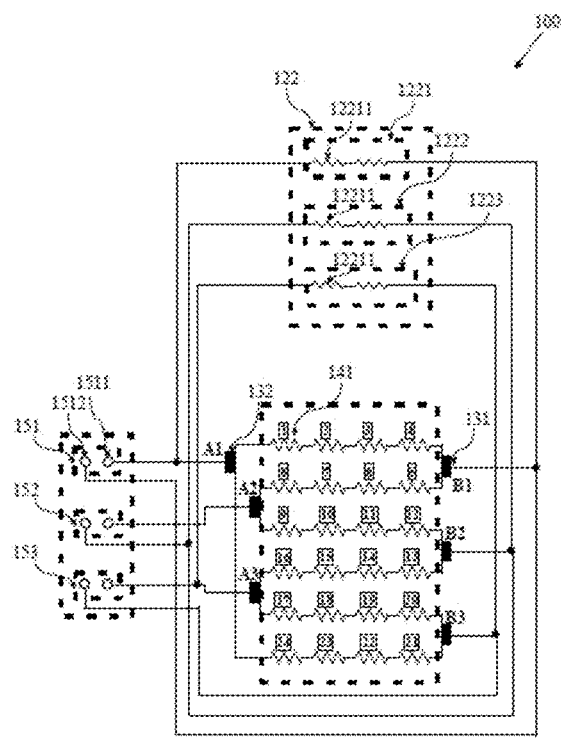
FIG. 12 is a diagram showing circuit connection of armature windings and field windings of the shunt wound direct current motor of Embodiment 2 of the present invention.

FIG. 10 is a schematic diagram showing circuit connection in the transversal section structure of a shunt wound direct current motor of Embodiment 2 of the present invention; FIG. 11 is a schematic diagram showing circuit connection of armature windings and field windings of a shunt wound direct current motor of the present invention; and FIG. 12 is a diagram showing circuit connection of armature windings and field windings of the shunt wound direct current motor of Embodiment 2 of the present invention.

In this embodiment, a direct current motor 100 is a shunt wound direct current motor which is connected to m pairs of power output terminals provided by at least one direct current power supply (not shown), and has a rated input current. When the number of the direct current power supply is one, the m pairs of power output terminals are wiring terminals of m power output branches of the direct current power supply, respectively; and when the number of the direct current power supplies is m, the m pairs of power output terminals are wiring terminals of the m direct current power supplies, respectively. The direct current power supply is any one of a chopper, a battery, and a commutating power supply, and in this embodiment, the direct current power supply is a chopper having a switching frequency of 1 kHz.

As shown in FIGS. 1 and 10, the direct current motor 100 includes a casing 11, a stator 12, brushes 13, a rotor 14, and a junction box (not shown). As shown in FIG. 11, m pairs of brushes are provided according to the value of the rated input current. As shown in FIGS. 12 and 5, m is set to be 3 in this embodiment. If the maximum output current of one pair of power output terminals is $I_1$, and the rated input current of the direct current motor is $I_{max}$, then the count of pairs of the brushes, i.e. m, satisfies the following condition: $m > I_{max}/I_1$.

As shown in FIGS. 1 and 10, the stator 12 is provided within the casing 11, and includes three pairs (i.e. six in total) of main poles 121, and a field winding part 122.

As shown in FIG. 10, each pair of main poles 121 includes an S-polarity main pole 1211 and an N-polarity main pole 1212. In all the main poles 121, two neighboring main poles 121 are opposite in polarity.

As shown in FIGS. 1, 10 and 11, the field winding part 122 includes three field winding units 1221 corresponding to the three pairs of main poles 121, respectively. Each field winding unit 1221 is made up of field coils 12211 formed by winding an insulated conductor strip, which is made of a metal wire coated with an insulating layer, around one pair of main poles 121 corresponding to each other. The insulated conductor strip is any one of an enameled wire, and an insulated copper conductor strip, and in this embodiment, the insulated conductor strip is an enameled wire. In this embodiment, the field coils 12211 on all the main poles 121 have the same number of turns, so that the motor can produce an uniform magnetic field during normal operation, and the torque is constant.

The insulated conductor strip of each field winding unit 1221 has one end and the other end, which are distinguished according to a preset current direction of the field coils 12211. The S-polarity main pole 1211 and the N-polarity main pole 1212 of each pair of main poles 121 correspond to the winding direction of the field coils 12211 and the preset current direction of the field coils 12211. The field coils 12211 of two neighboring main poles 121 have opposite current cycling directions.

The connection of the two field coils 12211 of each field winding unit 1221 is any one of series connection and parallel connection, and the connections of the two field coils 12211 of all the field winding units 1221 are identical. In this embodiment, the connection of the two field coils 12211 is series connection.

As shown in FIGS. 1 and 10, the three pairs (i.e. six in total) of brushes 13 are fixed within the casing 11, and each pair of brushes 13 includes an S-pole corresponding brush 131 corresponding to the S-polarity main pole 1211, and an N-pole corresponding brush 132 corresponding to the N-polarity main pole 1212. The two brushes 13 in each pair of brushes 13 are arranged at neighboring positions; and the spatial positions of each pair of brushes 13 correspond to those of each pair of main poles 121 corresponding to each other, so that the strength of the magnetic field in the armature windings can be kept at maximum when a failure happens, thereby producing a maximum torque.

The brushes 13 are any one of narrow brushes and wide brushes, and in this embodiment, the brushes 13 are narrow brushes. Each brush 13 includes a brush body, or at least two separately formed brush bodies which are arranged along the axial direction of the motor and electrically connected in parallel; and when the brush 13 includes at least two brush bodies, the actual contact area of each brush with the commutator is increased, thereby improving the commutation ability of the brush. As shown in FIG. 1, the brush 13 includes one brush body in this embodiment.

As shown in FIG. 11, all the m one ends of the insulated conductor strips of the field winding units 1221 are electrically connected to all the m N-pole corresponding brushes 132 in the brushes 13 to form m first wiring terminals 1511, while all the m the other ends of the insulated conductor strips of the field winding units 1221 are electrically connected to all the m S-pole corresponding brushes 131 in the brushes 13 to form m second wiring terminals 1512, the m first wiring terminals 1511 and the m second wiring terminals 1512 correspondingly form m pairs of external wiring terminals (i.e. m wiring units), respectively, and the m pairs of external wiring terminals are for connection to the m pairs of power output terminals in one-to-one correspondence. Of course, according to the need, it is also possible that all the m one ends of the insulated conductor strips of the field winding units 1221 are electrically connected to all the m S-pole corresponding brushes 131 in the brushes 13 to form m first wiring terminals 1511, while all the m the other ends of the insulated conductor strips of the field winding units 1221 are electrically connected to all the m N-pole corresponding brushes 132 in the brushes to form m second wiring terminals 1512.

In this embodiment, as shown in FIGS. 10 and 12, the first wiring terminal 1511 and the second wiring terminal 1512 correspondingly form a pair of external wiring terminals 151, the first wiring terminal 1521 and the second wiring terminal 1522 correspondingly form a pair of external wiring terminals 152, the first wiring terminal 1531 and the second wiring terminal 1532 correspondingly form a pair of wiring terminals 153, and the three pairs of external wiring terminals (i.e. the three wiring units) 151, 152 and 153 are for connection to the three pairs of power output terminals in one-to-one correspondence.

As shown in FIGS. 1 and 10, the rotor 14 is provided within the stator, and includes a plurality of armature windings 141 in a predetermined connection, and the number of the armature windings 141 is set to be 2m*n. The predetermined connection is any one of simplex lap connection, multiplex lap connection, and multiplex wave connection. In this embodiment, as shown in FIG. 5, the plurality of armature windings 141 are in a simplex lap connection in which two neighboring brushes 13 are connected to one armature winding branch, and each armature winding branch includes n armature windings 141.

The junction box (not shown) is fixed to the casing 11, and as shown in FIGS. 10 and 12, the three pairs of external wiring terminals 151, 152 and 153 are provided in the junction box.

Figure 13:
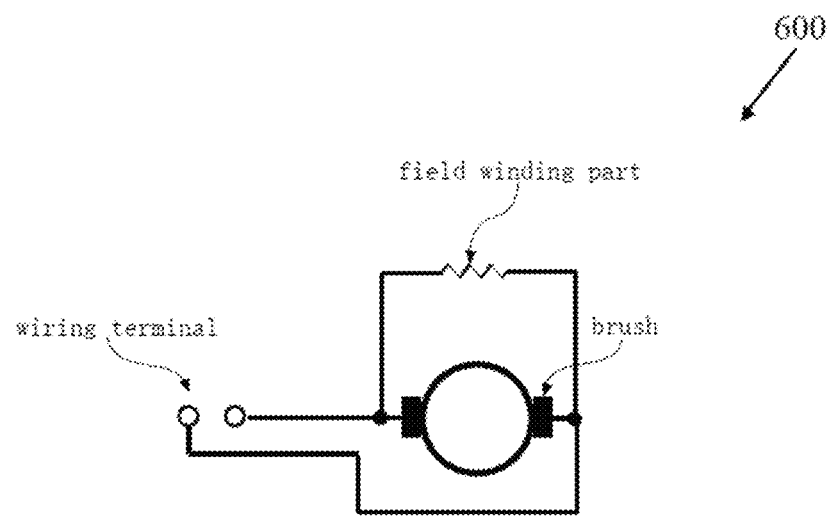
FIG. 13 is a schematic diagram showing circuit connection of a conventional shunt wound direct current motor.
Figure 14:
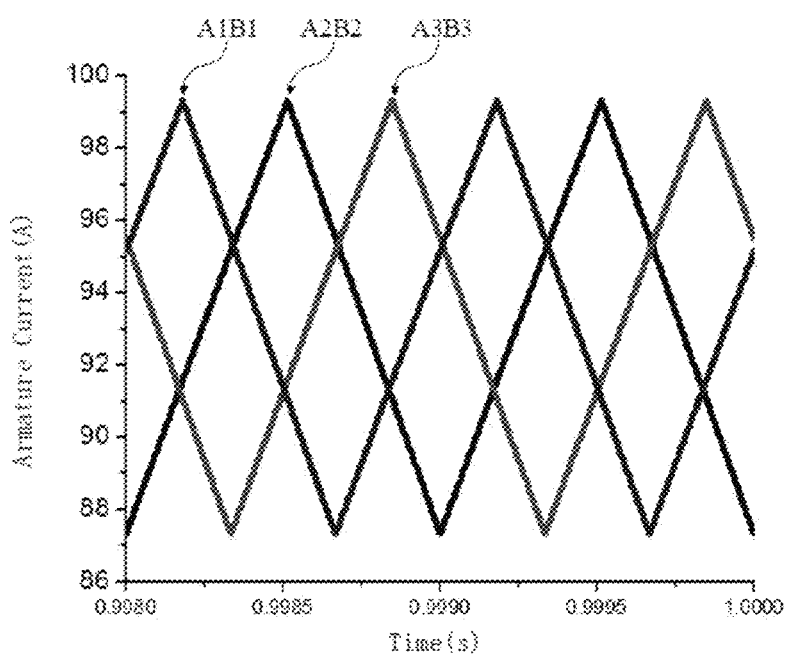
FIG. 14 is a graph showing input current waveforms of three pairs of brushes of the shunt wound direct current motor of Embodiment 2 of the present invention.
Figure 15:
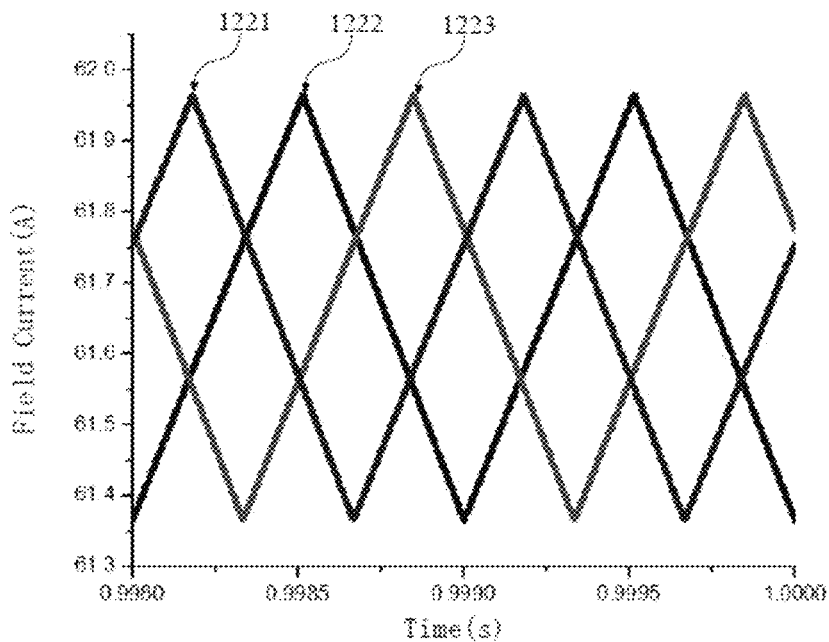
FIG. 15 is a graph showing input current waveforms of three field winding units of the shunt wound direct current motor of Embodiment 2 of the present invention.
Figure 16:
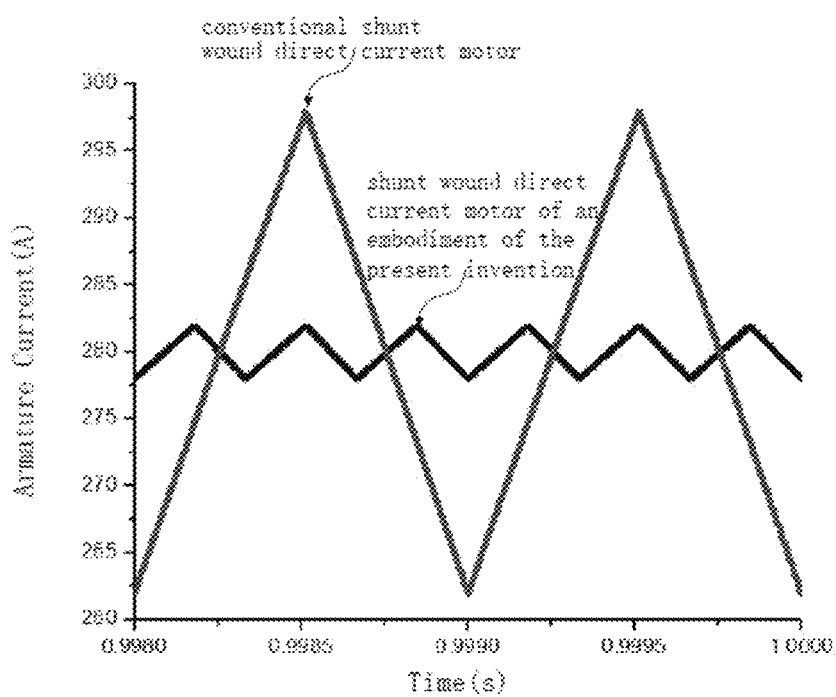
FIG. 16 is a graph comparing the armature current of the shunt wound direct current motor of Embodiment 2 of the present invention with that of a conventional shunt wound direct current motor.
Figure 17:
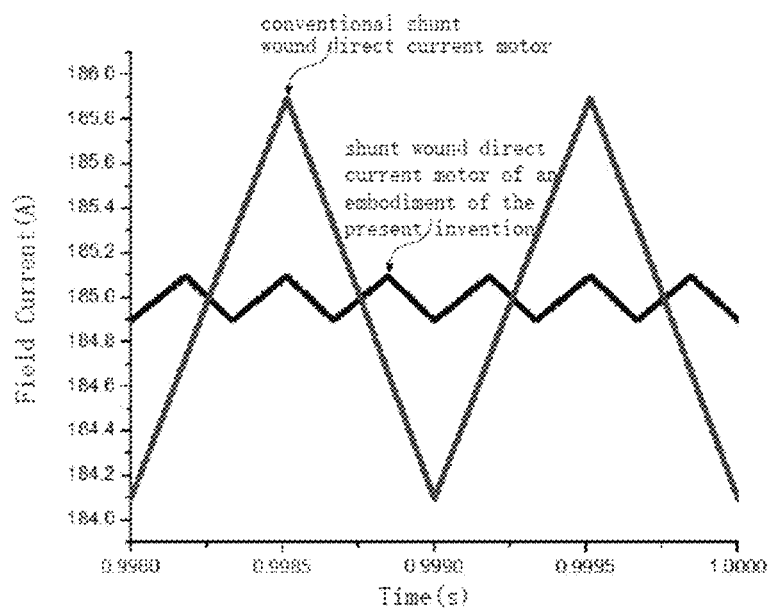
FIG. 17 is a graph comparing the field current of the shunt wound direct current motor of Embodiment 2 of the present invention with that of a conventional shunt wound direct current motor.
Figure 18:
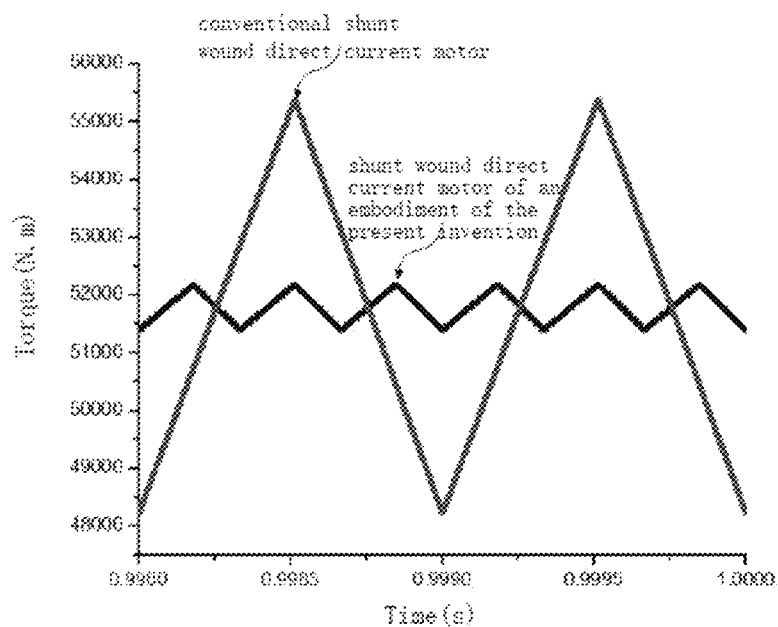
FIG. 18 is a graph comparing the torque of the shunt wound direct current motor of Embodiment 2 of the present invention with that of a conventional shunt wound direct current motor.

FIG. 13 is a schematic diagram showing circuit connection of a conventional shunt wound direct current motor; FIG. 14 is a graph showing input current waveforms of three pairs of brushes of the shunt wound direct current motor of Embodiment 2 of the present invention; FIG. 15 is a graph showing input current waveforms of three field winding units of the shunt wound direct current motor of Embodiment 2 of the present invention; FIG. 16 is a graph comparing the armature current of the shunt wound direct current motor of Embodiment 2 of the present invention with that of a conventional shunt wound direct current motor; FIG. 17 is a graph comparing the field current of the shunt wound direct current motor of Embodiment 2 of the present invention with that of a conventional shunt wound direct current motor; and FIG. 18 is a graph comparing the torque of the shunt wound direct current motor of Embodiment 2 of the present invention with that of a conventional shunt wound direct current motor.

As shown in FIG. 13, a conventional shunt wound direct current motor 600 only has one wiring unit, and the wiring unit is correspondingly electrically connected to a pair of power output terminals of a chopper (not shown) having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 14, for the three pairs of brushes A1B1, A2B2 and A3B3 of the shunt wound direct current motor of this embodiment, the ripples of the input currents are all equal to 99.31−87.33=11.99 amperes, the mean values are all equal to 93.32 amperes, and the ripple coefficients are all equal to 11.99/93.32*100%=12.84%.

As shown in FIG. 15, for the three field winding units 1221, 1222 and 1223 of the shunt wound direct current motor of this embodiment, the ripples of the input currents are all equal to 61.97−61.37=0.60 amperes, the mean values are all equal to 61.67 amperes, and the ripple coefficients are all equal to 0.60/61.67*100%=0.97%.

As shown in FIG. 16, in the steady state, for the shunt wound direct current motor of this embodiment whose armature current equals to the sum of the currents of the three pairs of brushes A1B1, A2B2 and A3B3, the ripple of the armature current is equal to 281.95−277.98=3.97 amperes, the mean value is equal to 279.97 amperes, and the ripple coefficient is equal to 3.97/279.97*100%=1.42%. For the conventional shunt wound direct current motor, the ripple of the armature current is equal to 297.94−261.98=35.96 amperes, the mean value is equal to 279.97 amperes, and the ripple coefficient is equal to 35.96/279.97*100%=12.84%. Although the mean value of the armature current of the shunt wound direct current motor of this embodiment is as same as that of the conventional shunt wound direct current motor, the ripple and the ripple coefficient of the armature current of the shunt wound direct current motor of this embodiment are only 1/9 of those of the conventional motor.

As shown in FIG. 17, in the steady state, for the shunt wound direct current motor of this embodiment whose field current equals to the sum of the currents of the three field winding units 1221, 1222 and 1223, the ripple of the field current is equal to 185.10−184.90=0.2 amperes, the mean value is equal to 185.0 amperes, and the ripple coefficient is equal to 0.2/185*100%=0.11%. For the conventional shunt wound direct current motor, the ripple of the armature current is equal to 185.9−184.1=1.8 amperes, the mean value is equal to 185.0 amperes, and the ripple coefficient is equal to 1.8/185.0*100%=0.97%. Although the mean value of the field current of the shunt wound direct current motor of this embodiment is as same as that of the conventional shunt wound direct current motor, the ripple and the ripple coefficient of the field current of the shunt wound direct current motor of this embodiment are only 1/9 of those of the conventional motor.

Given that the electromagnetic torque and motion equations of the shunt wound direct current motor are as follows $$\begin{cases} T_{em} = C_T \Phi I_a = L_{af} I_f I_a & (1) \\ T_{em} - T_{load} = J \dfrac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; $I_a$ is the armature current; $T_{load}$ is the load torque; J is the load moment of inertia, and is a constant; and $\Omega$ is the output angular velocity.

In this embodiment, the input current of the shunt wound direct current motor is equal to the sum of the armature current and the field current, and the rated input current of the shunt wound direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ takes value of 1, and in the steady state, as shown in FIG. 18, for the shunt wound direct current motor of this embodiment, the ripple of the torque is equal to 52188.25−51398.38=789.87 N·m, the mean value is equal to 51793.56 N·m, and the ripple coefficient is equal to 1.53%. For the conventional shunt wound direct current motor, the ripple of the torque is equal to 55386.15−48229.93=7156.21 N·m, the mean value is equal to 51798.89 N·m, and the ripple coefficient is equal to 13.82%.

That is to say, although the mean value of the torque of the shunt wound direct current motor of this embodiment is as same as that of the conventional shunt wound direct current motor, the ripple and the ripple coefficient of the torque of the shunt wound direct current motor of this embodiment are only 1/9 of those of the conventional motor, so that the ripple and the ripple coefficient of the output torque of the motor are reduced, and in turn the ripple and the ripple coefficient of the output speed of the motor are reduced, thereby achieving the purposes of reducing electromagnetic interference, vibration and noises of the motor and improving the performance of the shunt wound direct current motor and electric equipment.

Embodiment 3

Figure 19:
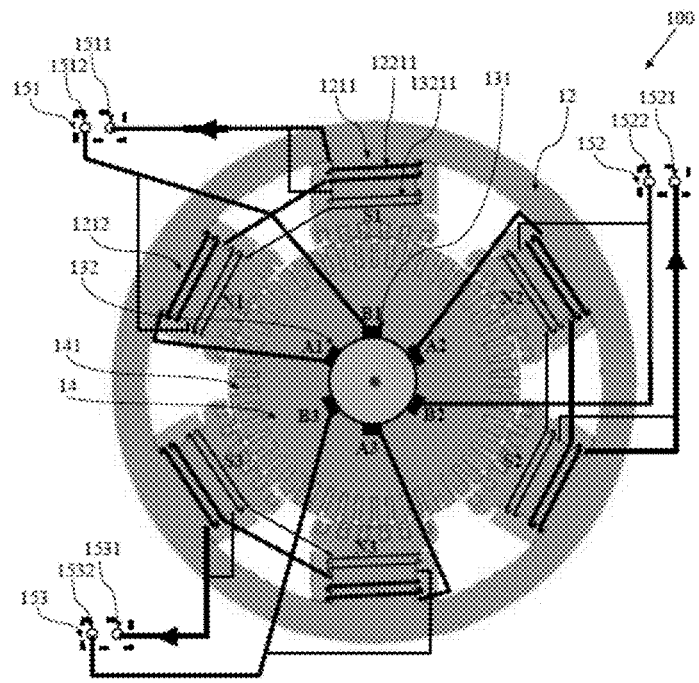
FIG. 19 is a schematic diagram showing circuit connection in the transversal section structure of a series-shunt wound direct current motor of Embodiment 3 of the present invention.
Figure 20:
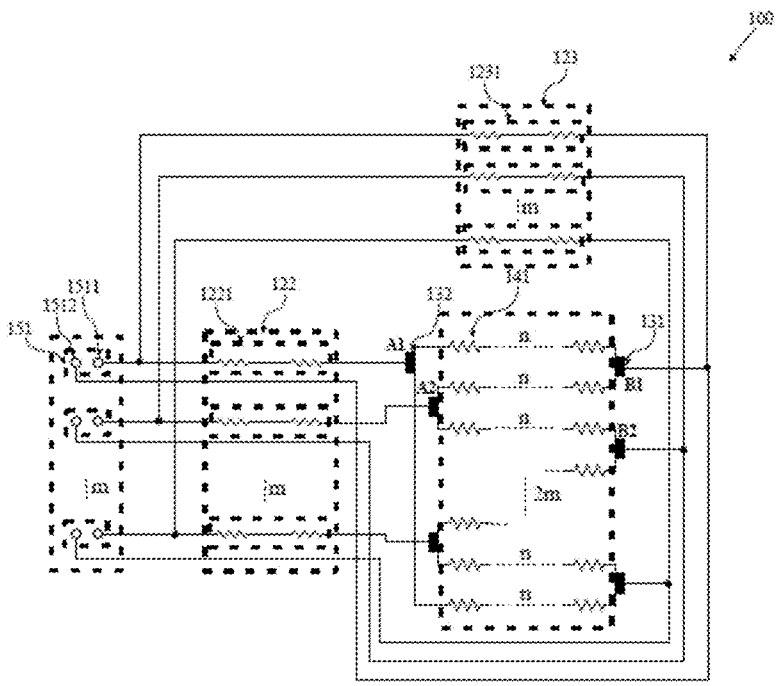
FIG. 20 is a schematic diagram showing circuit connection of armature windings and field windings of a series-shunt wound direct current motor of the present invention.
Figure 21:
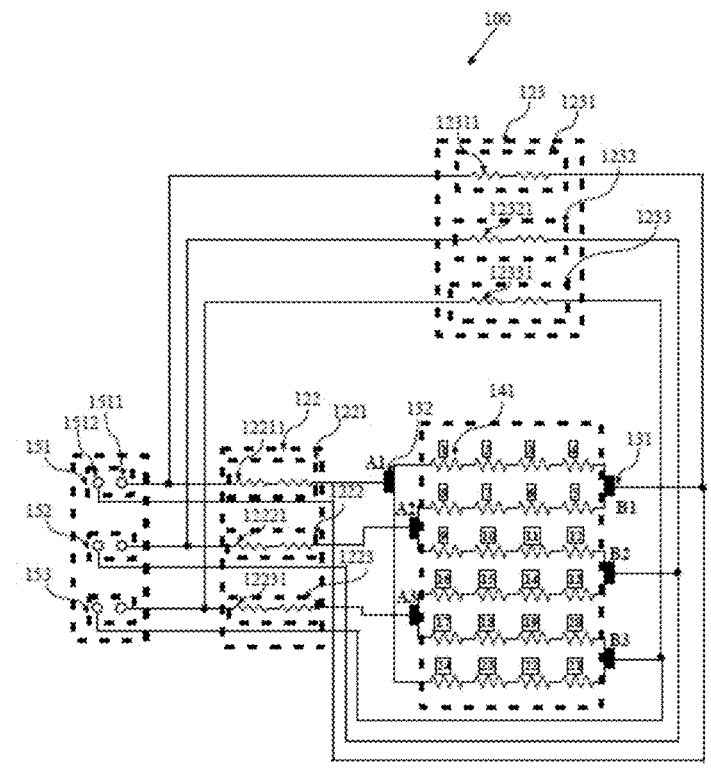
FIG. 21 is a schematic diagram showing circuit connection of armature windings and field windings of the series-shunt wound direct current motor of Embodiment 3 of the present invention.

FIG. 19 is a schematic diagram showing circuit connection in the transversal section structure of a series-shunt wound direct current motor of Embodiment 3 of the present invention; FIG. 20 is a schematic diagram showing circuit connection of armature windings and field windings of a series-shunt wound direct current motor of the present invention; and FIG. 21 is a schematic diagram showing circuit connection of armature windings and field windings of the series-shunt wound direct current motor of Embodiment 3 of the present invention.

In this embodiment, a direct current motor 100 is a series-shunt wound direct current motor which is connected to m pairs of power output terminals provided by at least one direct current power supply (not shown), and has a rated input current. When the number of the direct current power supply is one, the m pairs of power output terminals are wiring terminals of m power output branches of the direct current power supply, respectively; and when the number of the direct current power supplies is m, the m pairs of power output terminals are wiring terminals of the m direct current power supplies, respectively. The direct current power supply is any one of a chopper, a battery, and a commutating power supply, and in this embodiment, the direct current power supply is a chopper having a switching frequency of 1 kHz.

As shown in FIGS. 1 and 19, the direct current motor 100 includes a casing 11, a stator 12, brushes 13, a rotor 14, and a junction box (not shown). As shown in FIG. 3, m pairs of brushes are provided according to the value of the rated input current. As shown in FIGS. 4 and 5, m is set to be 3 in this embodiment. If the maximum output current of one pair of power output terminals is $I_1$, and the rated input current of the direct current motor is $I_{max}$, then the count of pairs of the brushes, i.e. m, satisfies the following condition: $m > I_{max}/I_1$.

As shown in FIGS. 1, 19 and 20, the stator 12 is provided within the casing 11, and includes three pairs (i.e. six in total) of main poles 121, a series field winding part 122, and a shunt field winding part 123.

As shown in FIG. 19, each pair of main poles 121 includes an S-polarity main pole 1211 and an N-polarity main pole 1212. In all the main poles 121, two neighboring main poles 121 are opposite in polarity.

As shown in FIGS. 1, 19 and 20, the series field winding part 122 includes three series field winding units 1221 corresponding to the three pairs of main poles 121, respectively. Each series field winding unit 1221 is made up of series field coils 12211 formed by winding an insulated conductor strip, which is made of a metal wire coated with an insulating layer, around one pair of main poles 121 corresponding to each other. In this embodiment, the series field coils 12211 on all the main poles 121 have the same number of turns, so that the motor can produce an uniform magnetic field during normal operation, and the torque is constant.

The insulated conductor strip of each series field winding unit 1221 has one end and the other end, which are distinguished according to a preset current direction of the series field coils 12211. The S-polarity main pole 1211 and the N-polarity main pole 1212 of each pair of main poles 121 correspond to the winding direction of the series field coils 12211 and the preset current direction of the series field coils 12211. The series field coils 12211 of two neighboring main poles 121 have opposite current cycling directions.

The connection of the two series field coils 12211 of each series field winding unit 1221 is any one of series connection and parallel connection, and the connections of the two series field coils 12211 of all the series field winding units 1221 are identical. In this embodiment, the connection of the two series field coils 12211 is a series connection.

As shown in FIGS. 1, 19 and 20, the shunt field winding part 123 includes three shunt field winding units 1231 corresponding to the three pairs of main poles 121, respectively. Each shunt field winding unit 1231 is made up of shunt field coils 12311 formed by winding an insulated conductor strip, which is made of a metal wire coated with an insulating layer, around one pair of main poles 121 corresponding to each other. In this embodiment, the shunt field coils 12311 on all the main poles 121 have the same number of turns, so that the motor can produce an uniform magnetic field during normal operation, and the torque is constant.

The insulated conductor strip of each shunt field winding unit 1231 has one end and the other end, which are distinguished according to a preset current direction of the shunt field coils 12311. The shunt field coils 12311 of two neighboring main poles 121 have opposite current cycling directions. In this embodiment, the series field coils 12211 and the shunt field coils 12311 on each main pole 121 have the same current cycling direction.

The connection of the two shunt field coils 12311 of each shunt field winding unit 1231 is any one of series connection and parallel connection, and the connections of the two shunt field coils 12311 of all the shunt field winding units 1231 are identical. In this embodiment, the connection of the two shunt field coils 12311 is a series connection.

The insulated conductor strip of the series field winding unit 1221 and the insulated conductor strip of the shunt field winding unit 1231 are any one of an enameled wire, and an insulated copper conductor strip, and in this embodiment, the insulated conductor strip is an enameled wire.

As shown in FIGS. 1 and 19, three pairs (i.e. six in total) of brushes 13 are fixedly provided within the casing 11, and each pair of brushes 13 includes an S-pole corresponding brush 131 corresponding to the S-polarity main pole 1211, and an N-pole corresponding brush 132 corresponding to the N-polarity main pole 1212. The two brushes 13 in each pair of brushes 13 are arranged at neighboring positions; and the spatial positions of each pair of brushes 13 correspond to those of each pair of main poles 121 corresponding to each other, so that the strength of the magnetic field in the armature windings can be kept at maximum when a failure happens, thereby producing a maximum torque.

The brushes 13 are any one of narrow brushes and wide brushes, and in this embodiment, the brushes 13 are narrow brushes. Each brush 13 includes a brush body, or at least two separately formed brush bodies which are arranged along the axial direction of the motor and electrically connected in parallel; and when the brush 13 includes at least two brush bodies, the actual contact area of each brush with the commutator is increased, thereby improving the commutation ability of the brush. As shown in FIG. 1, the brush 13 includes one brush body in this embodiment.

As shown in FIG. 20, all the m one series ends of the insulated conductor strips of the series field winding units 1221 are electrically connected to all the m N-pole corresponding brushes 132 in the brushes 13; all the m the other series ends of the insulated conductor strips of the series field winding units 1221 form m first wiring terminals 1511, lead-out terminals of the m S-pole corresponding brushes 131, which are not connected with the m one series ends, form m second wiring terminals 1512, the m first wiring terminals 1511 and the m second wiring terminals 1512 correspondingly form m pairs of external wiring terminals (i.e. m wiring units), respectively, and the m pairs of external wiring terminals are for connection to the m pairs of power output terminals in one-to-one correspondence. Of course, according to the need, it is also possible that all the m one series ends of the insulated conductor strips of the series field winding units 1221 are electrically connected to all the m S-pole corresponding brush-pole corresponding brushes 131 in the brushes 13, and lead-out terminals of the m N-pole corresponding brushes 132, which are not connected with the one ends of the insulated conductor strips of the series field winding units 1221, form m second wiring terminals 1512.

All the m one shunt ends of the insulated conductor strips of the shunt field winding units 123 are connected to the m first wiring terminals 1511 in one-to-one correspondence, while all the m the other shunt ends of the insulated conductor strips of the shunt field winding units 123 are connected to the m second wiring terminals 1512 in one-to-one correspondence. Of course, according to the need, it is also possible that all the m the other shunt ends of the insulated conductor strips of the shunt field winding units 123 are connected to the m first wiring terminals 1511 in one-to-one correspondence, while all the m one shunt ends of the insulated conductor strips of the shunt field winding units 123 are connected to the m second wiring terminals 1512 in one-to-one correspondence.

In this embodiment, as shown in FIGS. 19 and 21, the first wiring terminal 1511 and the second wiring terminal 1512 correspondingly form a pair of external wiring terminals 151, the first wiring terminal 1521 and the second wiring terminal 1522 correspondingly form a pair of external wiring terminals 152, the first wiring terminal 1531 and the second wiring terminal 1532 correspondingly form a pair of wiring terminals 153, and the three pairs of external wiring terminals (i.e. the three wiring units) 151, 152 and 153 are for connection to the three pairs of power output terminals in one-to-one correspondence. The excitation of the three series field winding units 122 and the corresponding three shunt field winding units 123 may be any one of cumulative compound excitation and differential compound excitation, and in this embodiment, is cumulative compound excitation, so that the magnetic field excited by the main poles is large, and the torque of the motor is large.

As shown in FIGS. 1 and 19, the rotor 14 is provided within the stator 12, and includes a plurality of armature windings 141 in a predetermined connection, and the number of the armature windings 141 is set to be 2m*n. The predetermined connection is any one of simplex lap connection, multiplex lap connection, and multiplex wave connection. In this embodiment, as shown in FIG. 5, the plurality of armature windings 141 are in a simplex lap connection in which two neighboring brushes 13 are connected to one armature winding branch, and each armature winding branch includes n armature windings 141.

The junction box (not shown) is fixed to the casing 11, and as shown in FIGS. 19 and 21, the three pairs of external wiring terminals 151, 152 and 153 are provided in the junction box.

Figure 22:
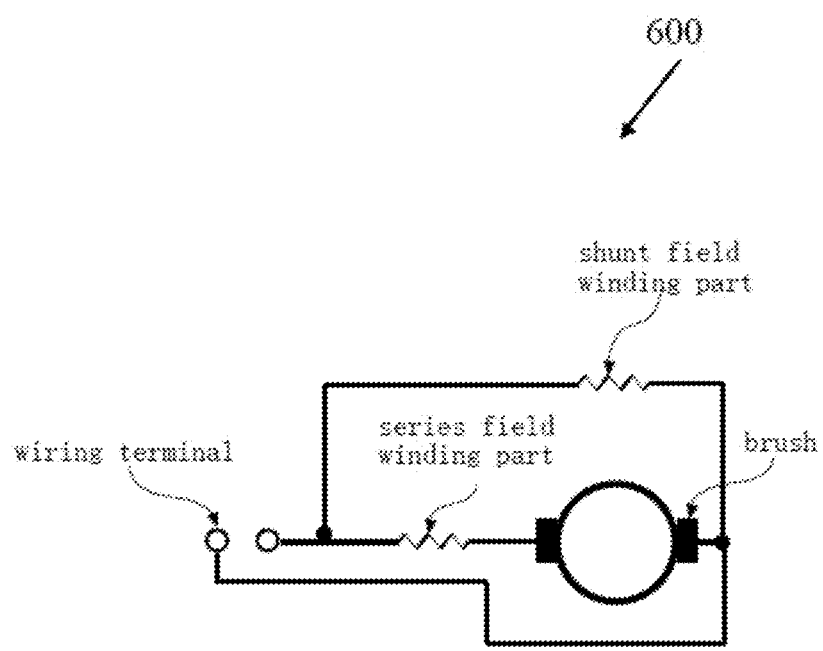
FIG. 22 is a schematic diagram showing circuit connection of a conventional series-shunt wound direct current motor.
Figure 23:
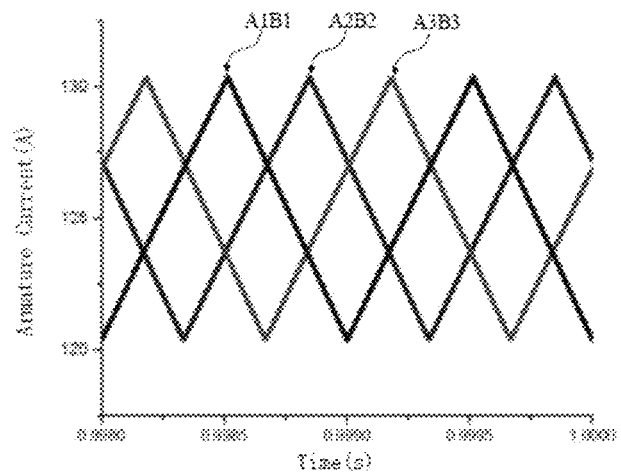
FIG. 23 is a graph showing input current waveforms of three pairs of brushes of the series-shunt wound direct current motor of Embodiment 3 of the present invention.
Figure 24:
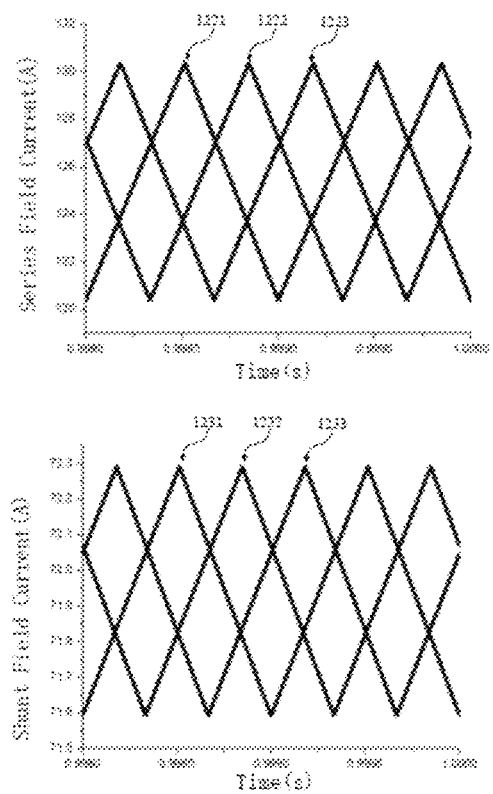
FIG. 24 is a graph showing input current waveforms of three field winding units of the series-shunt wound direct current motor of Embodiment 3 of the present invention.
Figure 25:
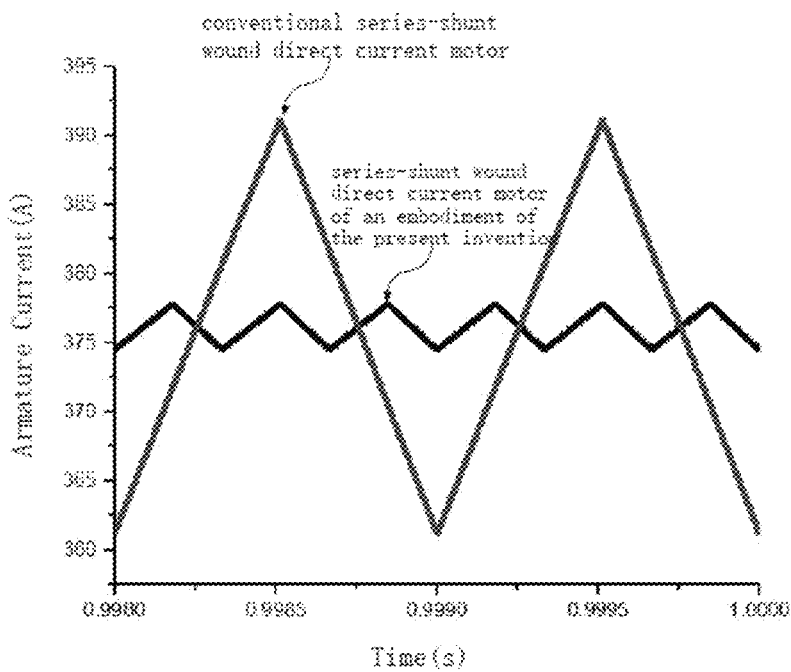
FIG. 25 is a graph comparing the armature current of the series-shunt wound direct current motor of Embodiment 3 of the present invention with that of a conventional series-shunt wound direct current motor.
Figure 26:
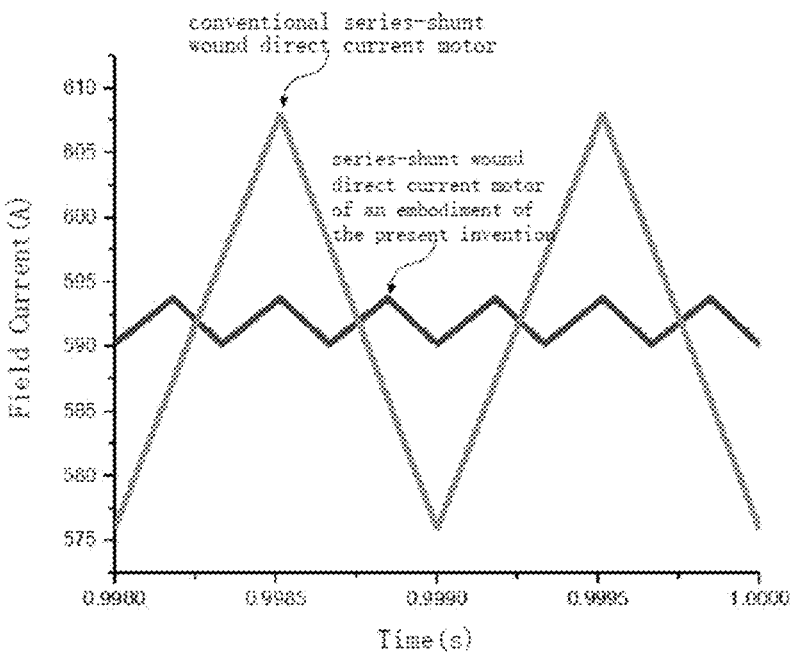
FIG. 26 is a graph comparing the field current of the series-shunt wound direct current motor of Embodiment 3 of the present invention with that of a conventional series-shunt wound direct current motor.
Figure 27:
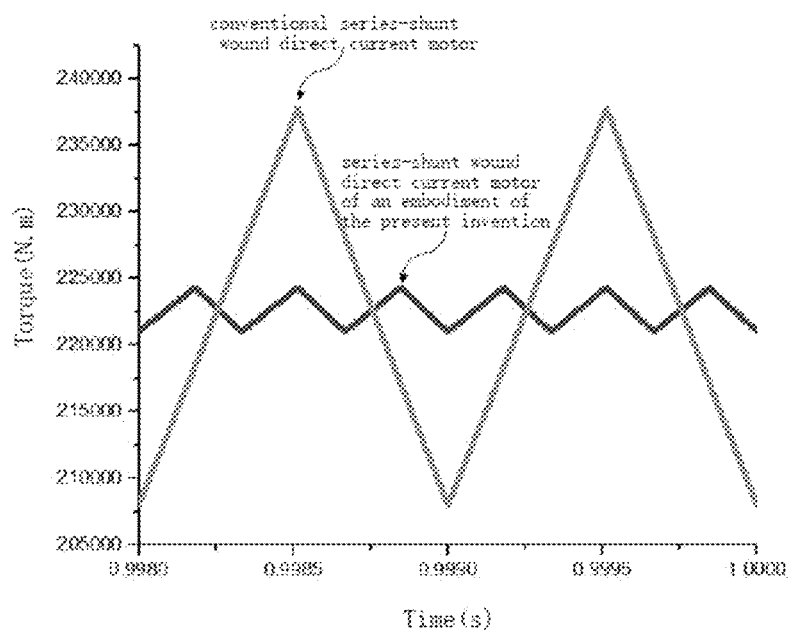
FIG. 27 is a graph comparing the torque of the series-shunt wound direct current motor of Embodiment 3 of the present invention with that of a conventional series-shunt wound direct current motor.

FIG. 22 is a schematic diagram showing circuit connection of a conventional series-shunt wound direct current motor; FIG. 23 is a graph showing input current waveforms of three pairs of brushes of the series-shunt wound direct current motor of Embodiment 3 of the present invention; FIG. 24 is a graph showing input current waveforms of three field winding units of the series-shunt wound direct current motor of Embodiment 3 of the present invention; FIG. 25 is a graph comparing the armature current of the series-shunt wound direct current motor of Embodiment 3 of the present invention with that of a conventional series-shunt wound direct current motor; FIG. 26 is a graph comparing the field current of the series-shunt wound direct current motor of Embodiment 3 of the present invention with that of a conventional series-shunt wound direct current motor; and FIG. 27 is a graph comparing the torque of the series-shunt wound direct current motor of Embodiment 3 of the present invention with that of a conventional series-shunt wound direct current motor.

As shown in FIG. 22, a conventional series-shunt wound direct current motor 600 only has one wiring unit, and the wiring unit is correspondingly electrically connected to a pair of power output terminals of a chopper (not shown) having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 23, for the three pairs of brushes A1B1, A2B2 and A3B3 of the series-shunt wound direct current motor of this embodiment, the ripples of the currents are all equal to 130.38−120.40=9.98 amperes, the mean values are all equal to 125.39 amperes, and the ripple coefficients are all equal to 9.98/125.39*100%=7.96%.

As shown in FIG. 24, for the three series field winding units 1221, 1222 and 1223 of the series-shunt wound direct current motor of this embodiment, the ripples of the currents are all equal to 130.38−120.40=9.98 amperes, the mean values are all equal to 125.39 amperes, and the ripple coefficients are all equal to 9.98/125.39*100%=7.96%. For the three shunt field winding units 1231, 1232 and 1233, the ripples of the currents are all equal to 72.29−71.59=0.70 amperes, the mean values are all equal to 71.94 amperes, and the ripple coefficients are all equal to 0.70/71.94*100%=0.97%.

As shown in FIG. 25, in the steady state, for the series-shunt wound direct current motor of this embodiment whose armature current equals to the sum of the currents of the three pairs of brushes A1B1, A2B2 and A3B3, the ripple of the armature current is equal to 377.82 −374.51=3.31 amperes, the mean value is equal to 376.16 amperes, and the ripple coefficient is equal to 3.31/376.16*100%=0.88%. For the conventional series-shunt wound direct current motor, the ripple of the armature current is equal to 391.14−361.17=29.97 amperes, the mean value is equal to 376.16 amperes, and the ripple coefficient is 29.97/376.16*100%=7.97%. Although the mean value of the armature current of the series-shunt wound direct current motor of this embodiment is as same as that of the conventional series-shunt wound direct current motor, the ripple and the ripple coefficient of the armature current of the series-shunt wound direct current motor of this embodiment are only 1/9 of those of the conventional series-shunt wound direct current motor.

As shown in FIG. 26, in the steady state, for the series-shunt wound direct current motor of this embodiment whose field current equals to the sum of the currents of the three series field winding units 1221, 1222 and 1223 and the three shunt field winding units 1231, 1232 and 1233, the ripple of the field current is equal to 593.76−590.22=3.54 amperes, the mean value is equal to 591.99 amperes, and the ripple coefficient is equal to 3.54/591.99*100%=0.60%. For the conventional series-shunt wound direct current motor, the ripple of the armature current is equal to 608.02−575.95=32.07 amperes, the mean value is equal to 591.99 amperes, and the ripple coefficient is 32.07/591.99*100%=5.42%. Although the mean value of the field current of the series-shunt wound direct current motor of this embodiment is as same as that of the conventional series-shunt wound direct current motor, the ripple and the ripple coefficient of the field current of the series-shunt wound direct current motor of this embodiment are only 1/9 of those of the conventional series-shunt wound direct current motor.

Given that the electromagnetic torque and motion equations of the series-shunt wound direct current motor are as follows $$\begin{cases} T_{em} = C_T \Phi I_a = L_{af} I_f I_a & (1) \\ T_{em} - T_{load} = J\dfrac{d}{dt}\Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; Ia is the armature current; $T_{load}$ is the load torque; J is the load moment of inertia, and is a constant; and $\Omega$ is the output angular velocity.

In this embodiment, the input current of the series-shunt wound direct current motor is equal to the sum of the armature current and the shunt field current and also equal to the sum of the series field current and the shunt field current, and the rated input current of the series-shunt wound direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ takes value of 1, and in the steady state, as shown in FIG. 27, for the series-shunt wound direct current motor of this embodiment, the ripple of the torque is equal to 224331.78−221042.30=3289.48 N·m, the mean value is equal to 222686.66 N·m, and the ripple coefficient is equal to 3289.48/222686.66=1.48%. For the conventional series-shunt wound direct current motor, the ripple of the torque is equal to 237820.34−208017.82=29802.52 N·m, the mean value is equal to 222765.80 N·m, and the ripple coefficient is equal to 29802.52/222765.80=13.38%.

That is to say, although the mean value of the torque of the series-shunt wound direct current motor of this embodiment is as same as that of the conventional series-shunt wound direct current motor, the ripple and the ripple coefficient of the torque of the series-shunt wound direct current motor of this embodiment are only 1/9 of those of the conventional series-shunt wound direct current motor, so that the ripple and the ripple coefficient of the output torque of the motor are reduced, and in turn the ripple and the ripple coefficient of the output speed of the motor are reduced, thereby achieving the purpose of reducing electromagnetic interference, vibration and noises of the motor.

Embodiment 4

Figure 28:
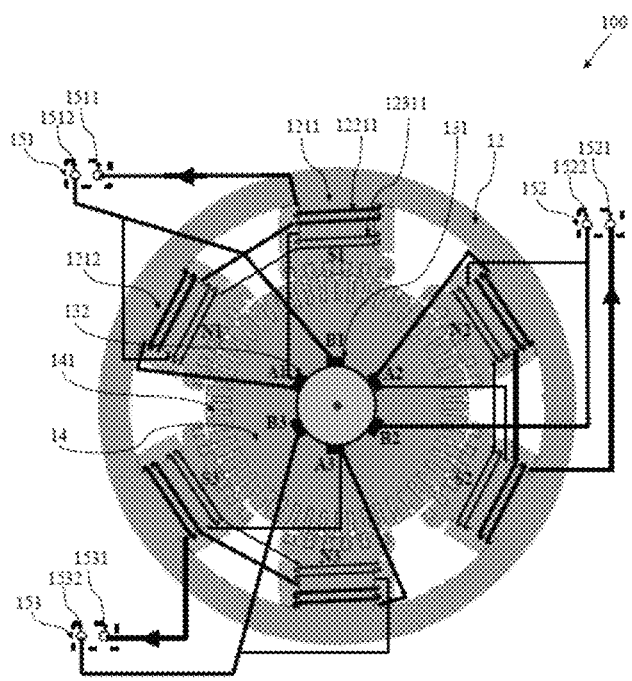
FIG. 28 is a schematic diagram showing circuit connection in the transversal section structure of a shunt-series wound direct current motor of Embodiment 4 of the present invention.
Figure 29:
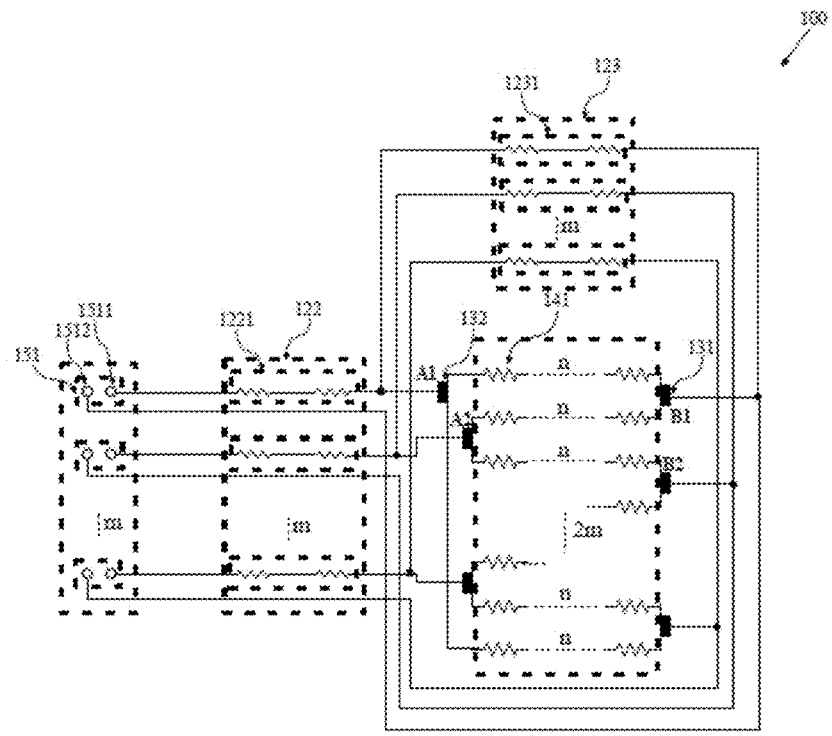
FIG. 29 is a schematic diagram showing circuit connection of armature windings and field windings of a shunt-series wound direct current motor of the present invention.
Figure 30:
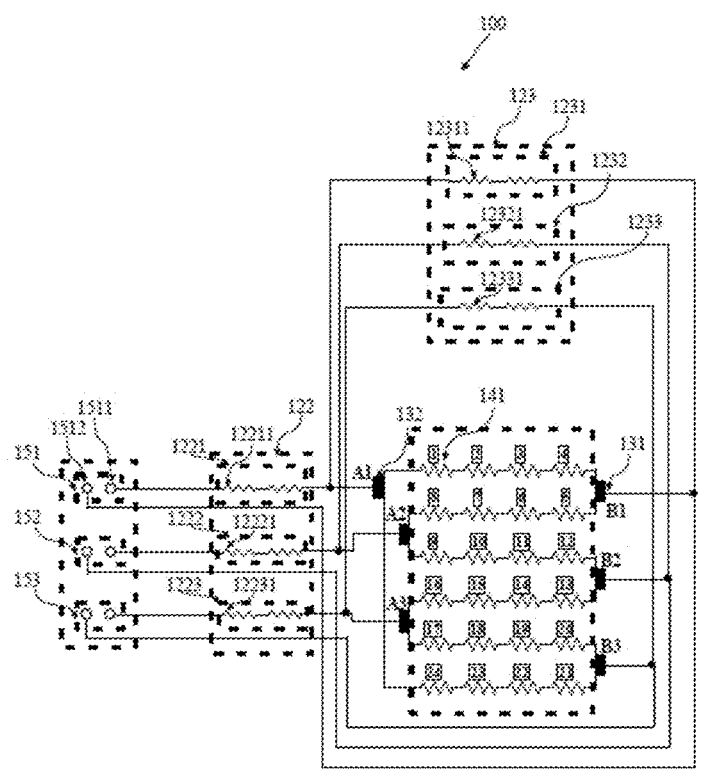
FIG. 30 is a schematic diagram showing circuit connection of armature windings and field windings of the shunt-series wound direct current motor of Embodiment 4 of the present invention.

FIG. 28 is a schematic diagram showing circuit connection in the transversal section structure of a shunt-series wound direct current motor of Embodiment 4 of the present invention; FIG. 29 is a schematic diagram showing circuit connection of armature windings and field windings of a shunt-series wound direct current motor of the present invention; and FIG. 30 is a schematic diagram showing circuit connection of armature windings and field windings of the shunt-series wound direct current motor of Embodiment 4 of the present invention.

In this embodiment, a direct current motor 100 is a shunt-series wound direct current motor which is connected to m pairs of power output terminals provided by at least one direct current power supply (not shown), and has a rated input current. When the number of the direct current power supply is one, the m pairs of power output terminals are wiring terminals of m power output branches of the direct current power supply, respectively; and when the number of the direct current power supplies is m, the m pairs of power output terminals are wiring terminals of the m direct current power supplies, respectively. The direct current power supply is any one of a chopper, a battery, and a commutating power supply, and in this embodiment, the direct current power supply is a chopper having a switching frequency of 1 kHz.

As shown in FIGS. 1 and 28, the direct current motor 100 includes a casing 11, a stator 12, brushes 13, a rotor 14, and a junction box (not shown). As shown in FIG. 29, m pairs of brushes are provided according to the value of the rated input current. As shown in FIGS. 29 and 5, m is set to be 3 in this embodiment. If the maximum output current of one pair of power output terminals is $I_1$, and the rated input current of the direct current motor is $I_{max}$, then the count of pairs of the brushes, i.e. m, satisfies the following condition: $m > I_{max}/I_1$.

As shown in FIGS. 1, 28 and 29, the stator 12 is provided within the casing 11, and includes three pairs (i.e. six in total) of main poles 121, a series field winding part 122, and a shunt field winding part 123.

As shown in FIG. 28, each pair of main poles 121 includes an S-polarity main pole 1211 and an N-polarity main pole 1212. In all the main poles 121, two neighboring main poles 121 are opposite in polarity.

As shown in FIGS. 1, 28 and 29, the series field winding part 122 includes three series field winding units 1221 corresponding to the three pairs of main poles 121, respectively. Each series field winding unit 1221 is made up of series field coils 12211 formed by winding an insulated conductor strip, which is made of a metal wire coated with an insulating layer, around one pair of main poles 121 corresponding to each other. In this embodiment, the series field coils 12211 on all the main poles 121 have the same number of turns, so that the motor can produce an uniform magnetic field during normal operation, and the torque is constant.

The insulated conductor strip of each series field winding unit 1221 has one end and the other end, which are distinguished according to a preset current direction of the series field coils 12211. The S-polarity main pole 1211 and the N-polarity main pole 1212 of each pair of main poles 121 correspond to the winding direction of the series field coils 12211 and the preset current direction of the series field coils 12211. The series field coils of two neighboring main poles 121 have opposite current cycling directions.

The connection of the two series field coils 12211 of each series field winding unit 1221 is any one of series connection and parallel connection, and the connections of the two series field coils 12211 of all the series field winding units 1221 are identical. In this embodiment, the connection of the two series field coils 12211 is a series connection.

As shown in FIGS. 1, 28 and 29, the shunt field winding part 123 includes three shunt field winding units 1231 corresponding to the three pairs of main poles 121, respectively. Each shunt field winding unit 1231 is made up of shunt field coils 12311 formed by winding an insulated conductor strip, which is made of a metal wire coated with an insulating layer, around one pair of main poles 121 corresponding to each other. In this embodiment, the shunt field coils 12311 on all the main poles 121 have the same number of turns, so that the motor can produce an uniform magnetic field during normal operation, and the torque is constant.

The insulated conductor strip of each shunt field winding unit 1231 has one end and the other end, which are distinguished according to a preset current direction of the shunt field coils 12311. The shunt field coils 12311 of two neighboring main poles 121 have opposite current cycling directions. In this embodiment, the series field coils 12211 and the shunt field coils 12311 on each main pole 121 have the same current cycling direction.

The connection of the two shunt field coils 12311 of each shunt field winding unit 1231 is any one of series connection and parallel connection, and the connections of the two shunt field coils 12311 of all the shunt field winding units 1231 are identical. In this embodiment, the connection of the two shunt field coils 12311 is a series connection.

The insulated conductor strip of the series field winding unit 1221 and the insulated conductor strip of the shunt field winding unit 1231 are any one of an enameled wire, and an insulated copper conductor strip, and in this embodiment, the insulated conductor strip is an enameled wire.

As shown in FIGS. 1 and 28, three pairs (i.e. six in total) of brushes 13 are fixedly provided within the casing 11, and each pair of brushes 13 includes an S-pole corresponding brush 131 corresponding to the S-polarity main pole 1211, and an N-pole corresponding brush 132 corresponding to the N-polarity main pole 1212. The two brushes 13 in each pair of brushes 13 are arranged at neighboring positions; and the spatial positions of each pair of brushes 13 correspond to those of each pair of main poles 121 corresponding to each other, so that the strength of the magnetic field in the armature windings can be kept at maximum when a failure happens, thereby producing a maximum torque.

The brushes 13 are any one of narrow brushes and wide brushes, and in this embodiment, the brushes 13 are narrow brushes. Each brush 13 includes a brush body, or at least two separately formed brush bodies which are arranged along the axial direction of the motor and electrically connected in parallel; and when the brush 13 includes at least two brush bodies, the actual contact area of each brush with the commutator is increased, thereby improving the commutation ability of the brush. As shown in FIG. 1, the brush 13 includes one brush body in this embodiment.

As shown in FIG. 29, all the m one shunt ends of the insulated conductor strips of the shunt field winding units 1231 are electrically connected to all the m N-pole corresponding brushes 132 in the brushes 13 to form m first electrical connection points, while all the m the other ends of the insulated conductor strips of the shunt field winding units 1231 are electrically connected to all the m S-pole corresponding brushes 131 in the brushes to form m second electrical connection points. Of course, according to the need, it is also possible that all the m the other shunt ends of the insulated conductor strips of the shunt field winding units 1231 are electrically connected to all the m N-pole corresponding brushes 132 in the brushes 13 to form m first electrical connection points, while all the m one ends of the insulated conductor strips of the shunt field winding units 1231 are electrically connected to all the m S-pole corresponding brushes 131 in the brushes 13 to form m second electrical connection points.

All the m one series ends of the insulated conductor strips of the series field winding units 1221 are correspondingly connected to the m first electrical connection points, respectively, while all the m the other series ends of the insulated conductor strips of the series field winding units 1221 form m first wiring terminals 1511; the m second electrical connection points form m second wiring terminals 1512, the m first wiring terminals 1511 and the m second wiring terminals 1512 correspondingly form m pairs of external wiring terminals (i.e. wiring units), respectively, and the m pairs of external wiring terminals are for connection to the m pairs of power output terminals in one-to-one correspondence. Of course, according to the need, it is also possible that all the m the other series ends of the insulated conductor strips of the series field winding units 1221 are correspondingly connected to the m first electrical connection points, respectively, while all the m one series ends of the insulated conductor strips of the series field winding units 1221 form m first wiring terminals 1511.

In this embodiment, as shown in FIGS. 28 and 30, the first wiring terminal 1511 and the second wiring terminal 1512 correspondingly form a pair of external wiring terminals 151, the first wiring terminal 1521 and the second wiring terminal 1522 correspondingly form a pair of external wiring terminals 152, the first wiring terminal 1531 and the second wiring terminal 1532 correspondingly form a pair of wiring terminals 153, and the three pairs of external wiring terminals (i.e. the three wiring units) 151, 152 and 153 are for connection to the three pairs of power output terminals in one-to-one correspondence. The excitation of the three series field winding units 122 and the corresponding three shunt field winding units 123 may be any one of cumulative compound excitation and differential compound excitation, and in this embodiment, is cumulative compound excitation, so that the magnetic field excited by the main poles is large, and the torque of the motor is large.

As shown in FIGS. 1 and 28, the rotor 14 is provided within the stator 12, and includes a plurality of armature windings 141 in a predetermined connection, and the number of the armature windings 141 is set to be 2m*n. The predetermined connection is any one of simplex lap connection, multiplex lap connection, and multiplex wave connection. In this embodiment, as shown in FIG. 5, the plurality of armature windings 141 are in a simplex lap connection in which two neighboring brushes 13 are connected to one armature winding branch, and each armature winding branch includes n armature windings 141.

The junction box (not shown) is fixed to the casing 11, and as shown in FIGS. 28 and 30, the three pairs of external wiring terminals 151, 152 and 153 are provided in the junction box.

Figure 31:
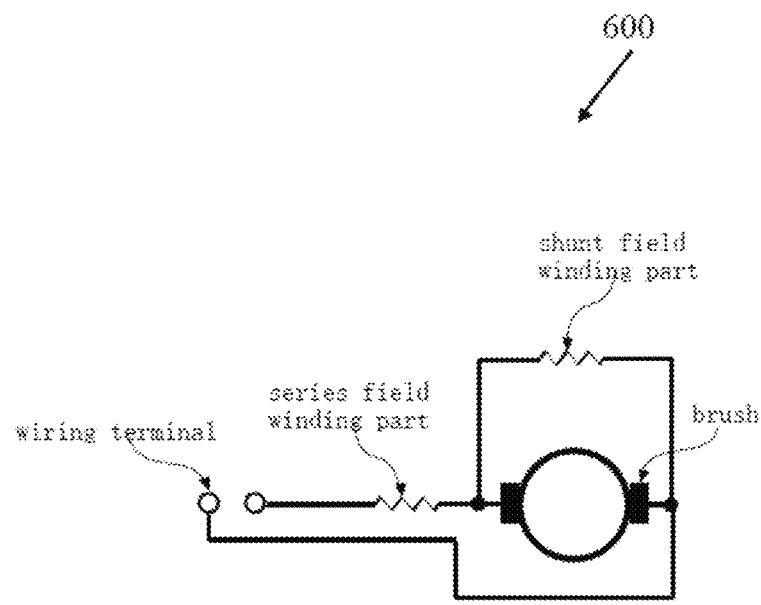
FIG. 31 is a schematic diagram showing circuit connection of a conventional shunt-series wound direct current motor.
Figure 32:
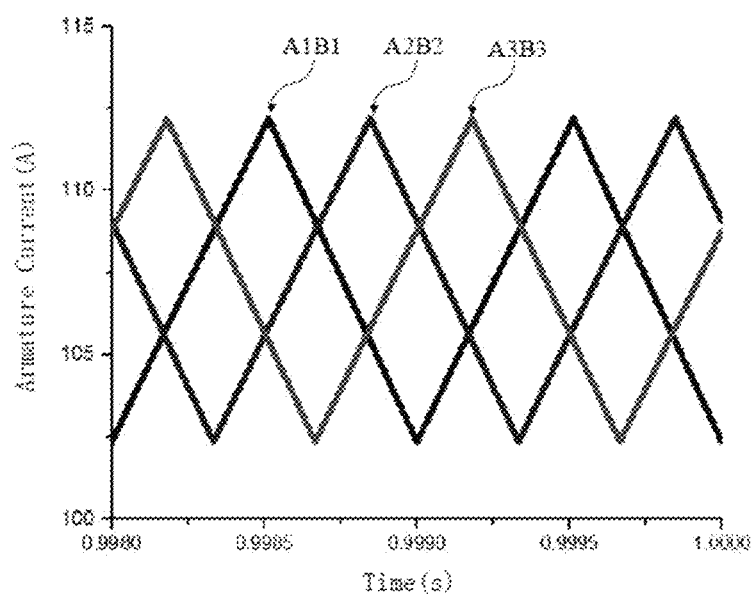
FIG. 32 is a graph showing input current waveforms of three pairs of brushes of the shunt-series wound direct current motor of Embodiment 4 of the present invention.
Figure 33:
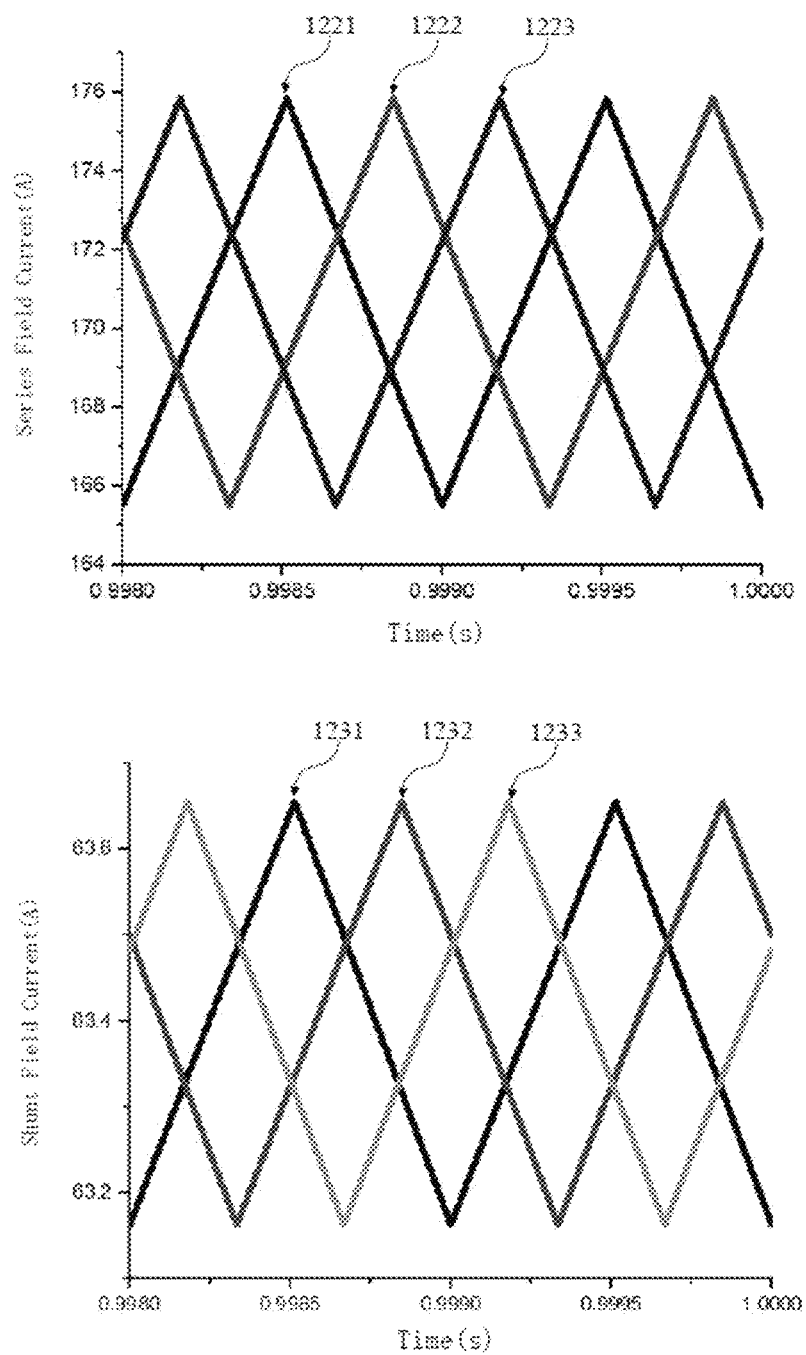
FIG. 33 is a graph showing input current waveforms of three field winding units of the shunt-series wound direct current motor of Embodiment 4 of the present invention.
Figure 34:
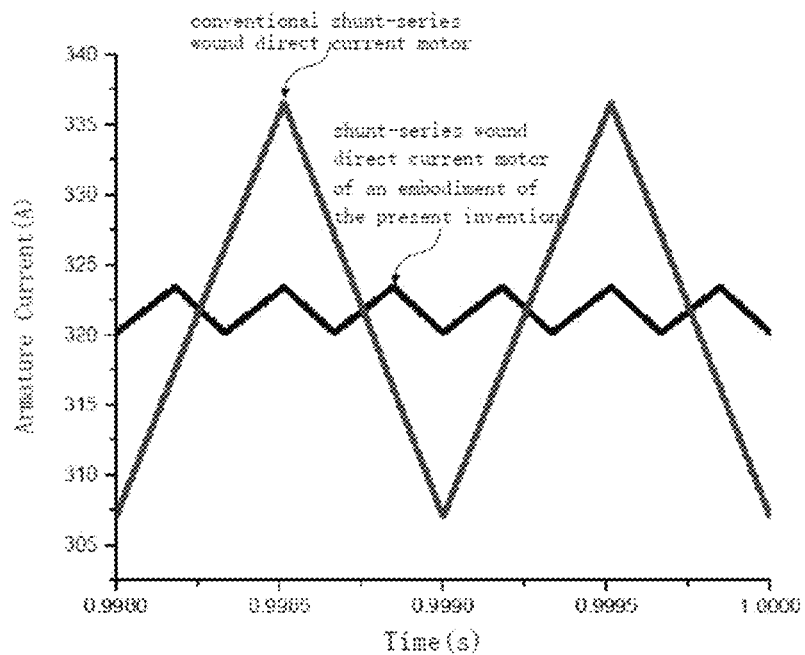
FIG. 34 is a graph comparing the armature current of the shunt-series wound direct current motor of Embodiment 4 of the present invention with that of a conventional shunt-series wound direct current motor.
Figure 35:
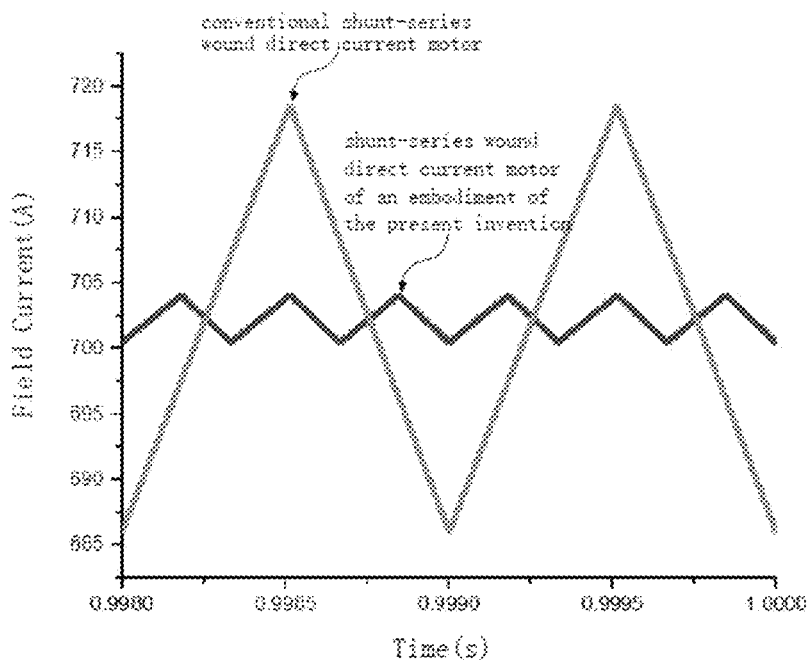
FIG. 35 is a graph comparing the field current of the shunt-series wound direct current motor of Embodiment 4 of the present invention with that of a conventional shunt wound direct current motor.
Figure 36:
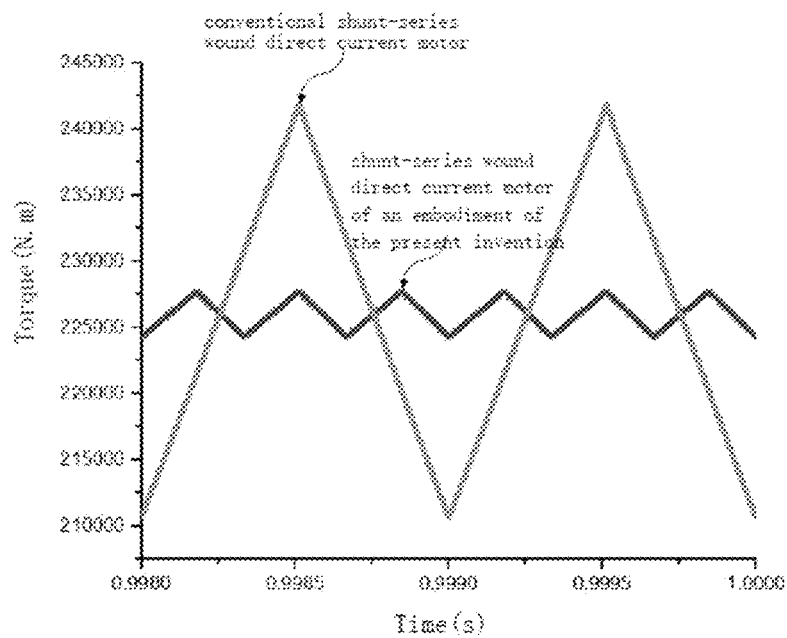
FIG. 36 is a graph comparing the torque of the shunt-series wound direct current motor of Embodiment 4 of the present invention with that of a conventional shunt-series wound direct current motor.

FIG. 31 is a schematic diagram showing circuit connection of a conventional shunt-series wound direct current motor; FIG. 32 is a graph showing input current waveforms of three pairs of brushes of the shunt-series wound direct current motor of Embodiment 4 of the present invention; FIG. 33 is a graph showing input current waveforms of three field winding units of the shunt-series wound direct current motor of Embodiment 4 of the present invention; FIG. 34 is a graph comparing the armature current of the shunt-series wound direct current motor of Embodiment 4 of the present invention with that of a conventional shunt-series wound direct current motor; FIG. 35 is a graph comparing the field current of the shunt-series wound direct current motor of Embodiment 4 of the present invention with that of a conventional shunt wound direct current motor; and FIG. 36 is a graph comparing the torque of the shunt-series wound direct current motor of Embodiment 4 of the present invention with that of a conventional shunt-series wound direct current motor.

As shown in FIG. 31, a conventional shunt-series wound direct current motor 600 only has one wiring unit, and the wiring unit is correspondingly electrically connected to a pair of power output terminals of a chopper (not shown) having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 32, for the three pairs of brushes A1B1, A2B2 and A3B3 of the shunt-series wound direct current motor of this embodiment, the ripples of the input current are all equal to 112.19−102.35=9.84 amperes, the mean values are all equal to 107.27 amperes, and the ripple coefficients are all equal to 9.84/107.27*100%=9.17%.

As shown in FIG. 33, for the three series field winding units 1221, 1222 and 1223 of the shunt-series wound direct current motor of this embodiment, the ripples of the currents are all equal to 175.85−165.51=10.34 amperes, the mean values are all equal to 170.68 amperes, and the ripple coefficients are all equal to 10.34/170.68*100%=6.06%. For the three shunt field winding units 1231, 1232 and 1233, the ripples of the currents are all equal to 63.66−63.16=0.49 amperes, the mean values are all equal to 63.41 amperes, and the ripple coefficients are all equal to 0.49/63.41*100%=0.78%.

As shown in FIG. 34, in the steady state, for the shunt-series wound direct current motor of this embodiment whose armature current equals to the sum of the currents of the three pairs of brushes A1B1, A2B2 and A3B3, the ripple of the armature current is equal to 323.45 −320.18=3.26 amperes, the mean value is equal to 321.82 amperes, and the ripple coefficient is equal to 3.26/321.82*100%=1.01%. For the conventional shunt-series wound direct current motor, the ripple of the armature current is equal to 336.58−307.04=29.55 amperes, the mean value is equal to 321.82 amperes, and the ripple coefficient is 29.55/321.82*100%=9.18%. Although the mean value of the armature current of the shunt-series wound direct current motor of this embodiment is as same as that of the conventional shunt-series wound direct current motor, the ripple and the ripple coefficient of the armature current of the shunt-series wound direct current motor of this embodiment are only 1/9 of those of the conventional shunt-series wound direct current motor.

As shown in FIG. 35, in the steady state, for the shunt-series wound direct current motor of this embodiment whose field current equals to the sum of the currents of the series field winding units 1221, 1222 and 1223 and the three shunt field winding units 1231, 1232 and 1233, the ripple of the field current is equal to 704.06−700.48=3.59 amperes, the mean value is equal to 702.27 amperes, and the ripple coefficient is equal to 3.59/702.27*100%=0.51%. For the conventional shunt-series wound direct current motor, the ripple of the armature current is equal to 718.51−686.01=32.50 amperes, the mean value is equal to 702.27 amperes, and the ripple coefficient is equal to 32.50/702.27*100%=4.63%. Although the mean value of the field current of the shunt-series wound direct current motor of this embodiment is as same as that of the conventional shunt-series wound direct current motor, the ripple and the ripple coefficient of the field current of the shunt-series wound direct current motor of this embodiment are only 1/9 of those of the conventional shunt-series wound direct current motor.

Given that the electromagnetic torque and motion equations of the shunt-series wound direct current motor are as follows $$\begin{cases} T_{em} = C_T \Phi I_a = L_{af} I_f I_a & (1) \\ T_{em} - T_{load} = J \dfrac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; $I_a$ is the armature current; $T_{load}$ is the load torque; J is the load moment of inertia, and is a constant; and $\Omega$ is the output angular velocity.

In this embodiment, the input current of the shunt-series wound direct current motor is equal to the sum of the armature current and the shunt field current and also equal to the series field current, and the rated input current of the shunt-series wound direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ takes value of 1, and in the steady state, as shown in FIG. 36, for the shunt-series wound direct current motor of this embodiment, the ripple of the torque is equal to 227725.80−224281.17=3444.63 N·m, the mean value is equal to 226003.19 N·m, and the ripple coefficient is equal to 3444.63/226003.19=1.52%. For the conventional shunt-series wound direct current motor, the ripple of the torque is equal to 241839.18−210630.99=31208.19 N·m, the mean value is equal to 226082.27 N·m, and the ripple coefficient is equal to 13.80%.

That is to say, although the mean value of the torque of the shunt-series wound direct current motor of this embodiment is as same as that of the conventional shunt-series wound direct current motor, the ripple and the ripple coefficient of the torque of the shunt-series wound direct current motor of this embodiment are only 1/9 of those of the conventional shunt-series wound direct current motor, so that the ripple and the ripple coefficient of the output torque of the motor are reduced, and in turn the ripple and the ripple coefficient of the output speed of the motor are reduced, thereby achieving the purpose of reducing electromagnetic interference, vibration and noises of the motor.

Embodiment 5

Figure 37:
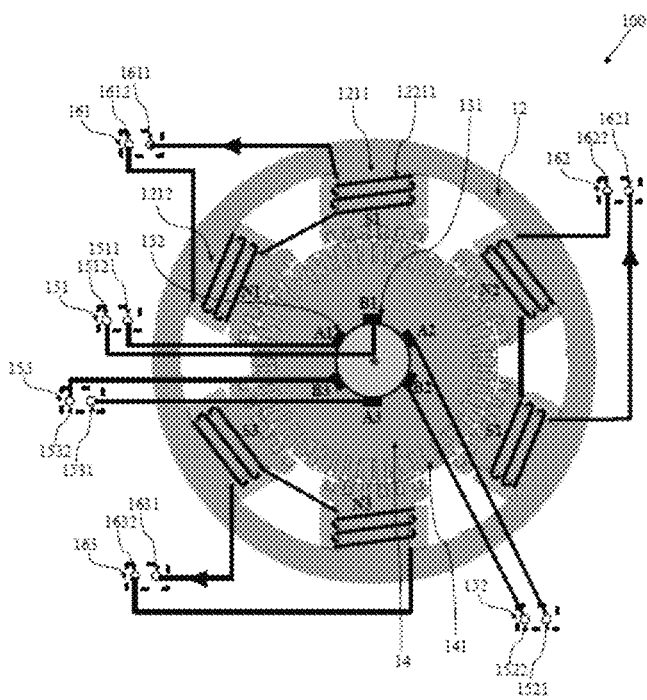
FIG. 37 is a schematic diagram showing circuit connection in the transversal section structure of a separately excited direct current motor of Embodiment 5 of the present invention.
Figure 38:
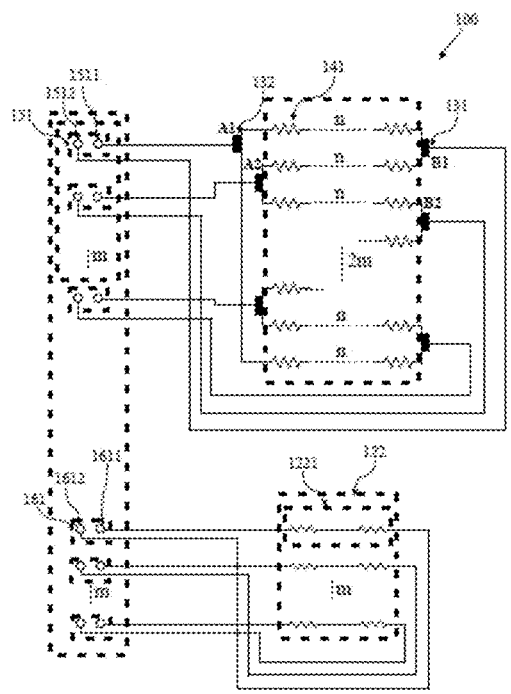
FIG. 38 is a schematic diagram showing circuit connection of armature windings and field windings of a separately excited direct current motor of the present invention.
Figure 39:
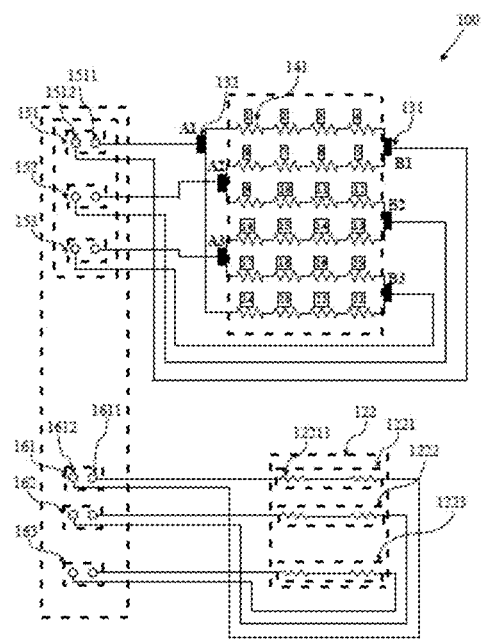
FIG. 39 is a schematic diagram showing circuit connection of armature windings and field windings of the separately excited direct current motor of Embodiment 5 of the present invention.

FIG. 37 is a schematic diagram showing circuit connection in the transversal section structure of a separately excited direct current motor of Embodiment 5 of the present invention; FIG. 38 is a schematic diagram showing circuit connection of armature windings and field windings of a separately excited direct current motor of the present invention; and FIG. 39 is a schematic diagram showing circuit connection of armature windings and field windings of the separately excited direct current motor of Embodiment 5 of the present invention.

In this embodiment, a direct current motor 100 is a separately excited direct current motor which is connected to m pairs of first power output terminals provided by at least one first direct current power supply (not shown) and m pairs of second power output terminals provided by at least one second direct current power supply, and has a rated input current and a rated field input current. When the number of the first direct current power supply is one, the m pairs of first power output terminals are wiring terminals of m first power output branches of the first direct current power supply, respectively; and when the number of the first direct current power supplies is m, the m pairs of first power output terminals are wiring terminals of the m first direct current power supplies, respectively. When the number of the second direct current power supply is one, and the m pairs of second power output terminals are wiring terminals of m second power output branches of the second direct current power supply, respectively; or when the number of the second direct current power supplies is m, and the m pairs of second power output terminals are wiring terminals of the m second direct current power supplies, respectively. The first direct current power supply and the second direct current power supply each is any one of a chopper, a battery, and a commutating power supply, and in this embodiment, the first direct current power supply and the second direct current power supply each is a chopper having a switching frequency of 1 kHz.

As shown in FIGS. 1 and 37, the separately excited direct current motor 100 includes a casing 11, a stator 12, brushes 13, a rotor 14, and a junction box (not shown). As shown in FIG. 38, m pairs of brushes are provided according to the value of the rated input current. As shown in FIGS. 39 and 5, m is set to be 3 in this embodiment. If the maximum output current of one pair of power output terminals is $I_1$, and the rated input current of the direct current motor is $I_{max}$, then the count of pairs of the brushes, i.e. m, satisfies the following condition: $m > I_{max}/I_1$.

As shown in FIGS. 1 and 37, the stator 12 is provided within the casing 11, and includes three pairs (i.e. six in total) of main poles 121, and a field winding part 122.

As shown in FIG. 37, each pair of main poles 121 includes an S-polarity main pole 1211 and an N-polarity main pole 1212. In all the main poles 121, two neighboring main poles 121 are opposite in polarity.

As shown in FIGS. 1, 37 and 38, the field winding part 122 includes three field winding units 1221 corresponding to the three pairs of main poles 121, respectively. Each field winding unit 1221 is made up of field coils 12211 formed by winding an insulated conductor strip, which is made of a metal wire coated with an insulating layer, around one pair of main poles 121 corresponding to each other. The insulated conductor strip is any one of an enameled wire, and an insulated copper conductor strip, and in this embodiment, the insulated conductor strip is an enameled wire. In this embodiment, the field coils 12211 on all the main poles 121 have the same number of turns, so that the motor can produce an uniform magnetic field during normal operation, and the torque is constant.

The insulated conductor strip of each field winding unit 1221 has one end and the other end, which are distinguished according to a preset current direction of the field coils 12211. The S-polarity main pole 1211 and the N-polarity main pole 1212 of each pair of main poles 121 correspond to the winding direction of the field coils 12211 and the preset current direction of the field coils 12211. The field coils 12211 of two neighboring main poles 121 have opposite current cycling directions.

The connection of the two field coils 12211 of each field winding unit 1221 is any one of series connection and parallel connection, and the connections of the two field coils 12211 of all the field winding units 1221 are identical. In this embodiment, the connection of the two field coils 12211 is series connection.

As shown in FIGS. 1 and 37, three pairs (i.e. six in total) of brushes 13 are fixedly provided within the casing 11, and each pair of brushes 13 includes an S-pole corresponding brush 131 corresponding to the S-polarity main pole 1211, and an N-pole corresponding brush 132 corresponding to the N-polarity main pole 1212. The two brushes 13 in each pair of brushes 13 are arranged at neighboring positions; and the spatial positions of each pair of brushes 13 correspond to those of each pair of main poles 121 corresponding to each other, so that the strength of the magnetic field in the armature windings can be kept at maximum when a failure happens, thereby producing a maximum torque.

The brushes 13 are any one of narrow brushes and wide brushes, and in this embodiment, the brushes 13 are narrow brushes. Each brush 13 includes a brush body, or at least two separately formed brush bodies which are arranged along the axial direction of the motor and electrically connected in parallel; and when the brush 13 includes at least two brush bodies, the actual contact area of each brush with the commutator is increased, thereby improving the commutation ability of the brush. As shown in FIG. 1, the brush 13 includes one brush body in this embodiment.

As shown in FIG. 39, two lead-out terminals of each pair of brushes 13 form a first armature wiring terminal 1511 and a second armature wiring terminal 1512, respectively, All the m first armature wiring terminals 1511 and the m second armature wiring terminals 1512 of the brushes 13 correspondingly form m pairs of external armature wiring terminals (i.e. m armature wiring units), respectively, and the m pairs of external armature wiring terminals are for connection to the m pairs of first power output terminals in one-to-one correspondence.

All the m one ends of the insulated conductor strips of the field winding units 1221 form m first field wiring terminals 1611, all the m the other ends of the insulated conductor strips of the field winding units 1221 form m second field wiring terminals 1612, the m first field wiring terminals 1611 and the m second field wiring terminals 1612 correspondingly form m pairs of external field wiring terminals (i.e. m field wiring units), respectively, and the m pairs of external field wiring terminals are for connection to the m pairs of second power output terminals in one-to-one correspondence.

In this embodiment, as shown in FIGS. 37 and 39, the first armature wiring terminal 1511 and the second armature wiring terminal 1512 correspondingly form a pair of external armature wiring terminals 151, the first armature wiring terminal 1521 and the second armature wiring terminal 1522 correspondingly form a pair of external armature wiring terminals 152, the first armature wiring terminal 1531 and the second armature wiring terminal 1532 correspondingly form a pair of armature wiring terminals 153, and the three pairs of external armature wiring terminals (i.e. three armature wiring units) 151, 152 and 153 are for connection to the three pairs of power output terminals in one-to-one correspondence.

The first field wiring terminal 1611 and the second field wiring terminal 1612 correspondingly form a pair of external field wiring terminals 161, The first field wiring terminal 1621 and the second field wiring terminal 1622 correspondingly form a pair of external field wiring terminals 162, The first field wiring terminal 1631 and the second field wiring terminal 1632 correspondingly form a pair of external field wiring terminals 163, and the three pairs of external field wiring terminals (i.e. three field wiring units) 161, 162 and 163 are for connection to the three pairs of power output terminals in one-to-one correspondence.

As shown in FIGS. 1 and 37, the rotor 14 is provided within the stator 12, and includes a plurality of armature windings 141 in a predetermined connection, and the number of the armature windings 141 is set to be 2m*n. The predetermined connection is any one of simplex lap connection, multiplex lap connection, and multiplex wave connection. In this embodiment, as shown in FIG. 5, the plurality of armature windings 141 are in a simplex lap connection in which two neighboring brushes 13 are connected to one armature winding branch, and each armature winding branch includes n armature windings 141.

The junction box (not shown) is fixed to the casing 11, and as shown in FIGS. 37 and 39, the three pairs of external armature wiring terminals 151, 152 and 153 and the three pairs of external field wiring terminals 161, 162 and 163 are provided in the junction box.

Figure 40:
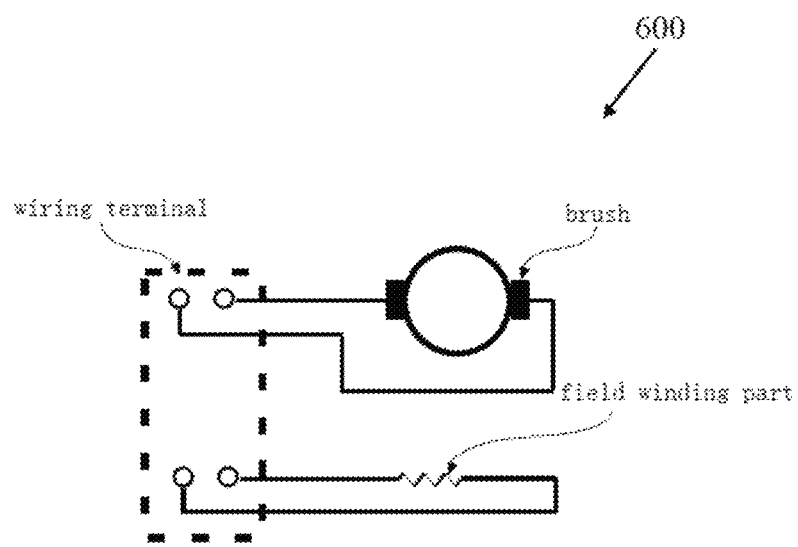
FIG. 40 is a schematic diagram showing circuit connection of a conventional separately excited direct current motor.
Figure 41:
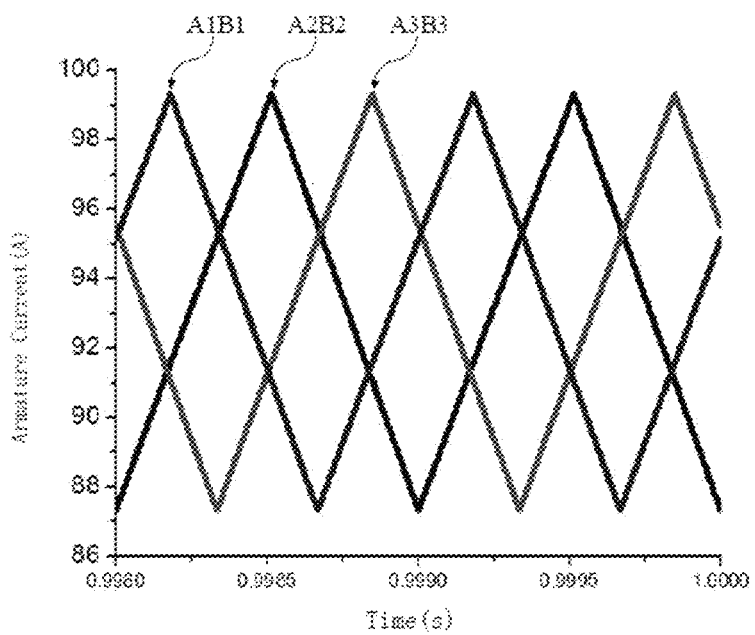
FIG. 41 is a graph showing input current waveforms of three pairs of brushes of the separately excited direct current motor of Embodiment 5 of the present invention.
Figure 42:
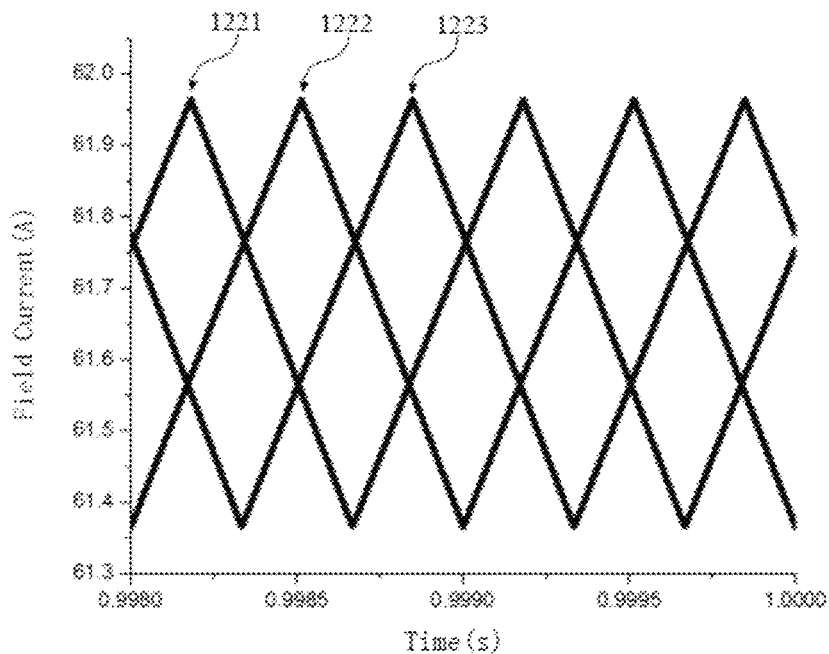
FIG. 42 is a graph showing input current waveforms of three field winding units of the separately excited direct current motor of Embodiment 5 of the present invention.
Figure 43:
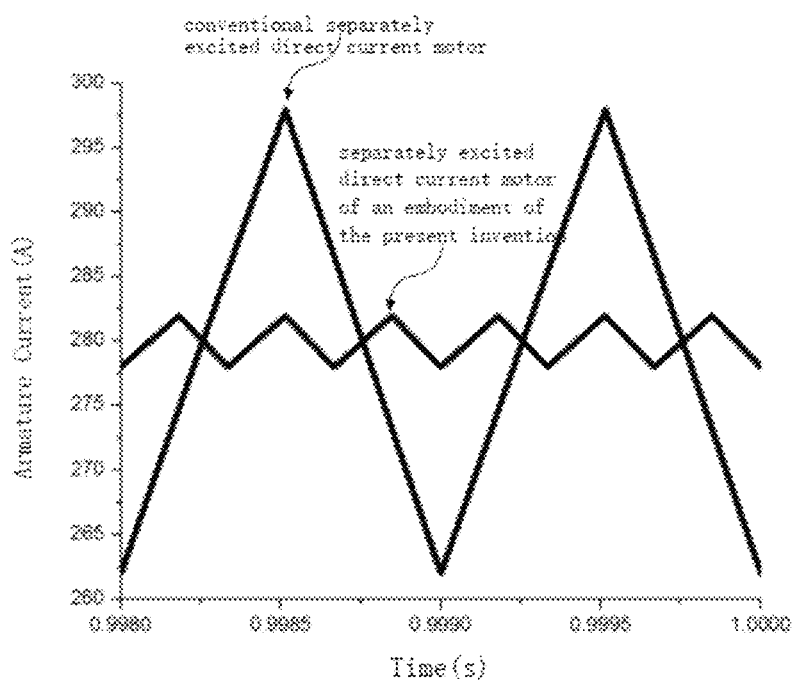
FIG. 43 is a graph comparing the armature current of the separately excited direct current motor of Embodiment 5 of the present invention with that of a conventional separately excited direct current motor.
Figure 44:
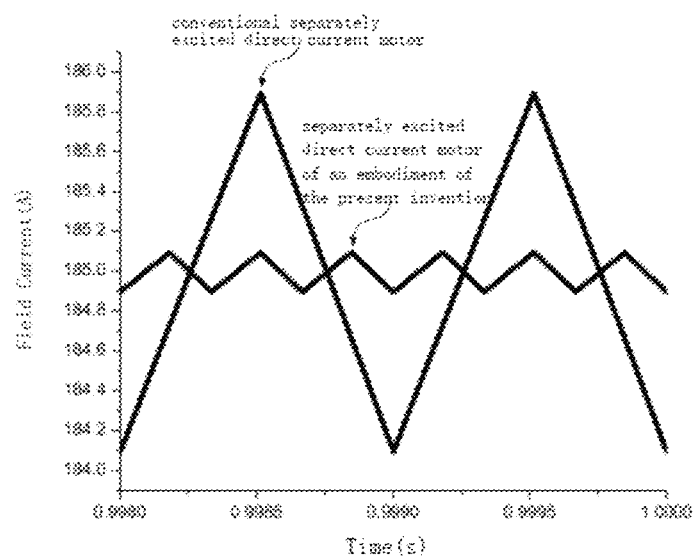
FIG. 44 is a graph comparing the field current of the separately excited direct current motor of Embodiment 5 of the present invention with that of a conventional separately excited direct current motor.
Figure 45:
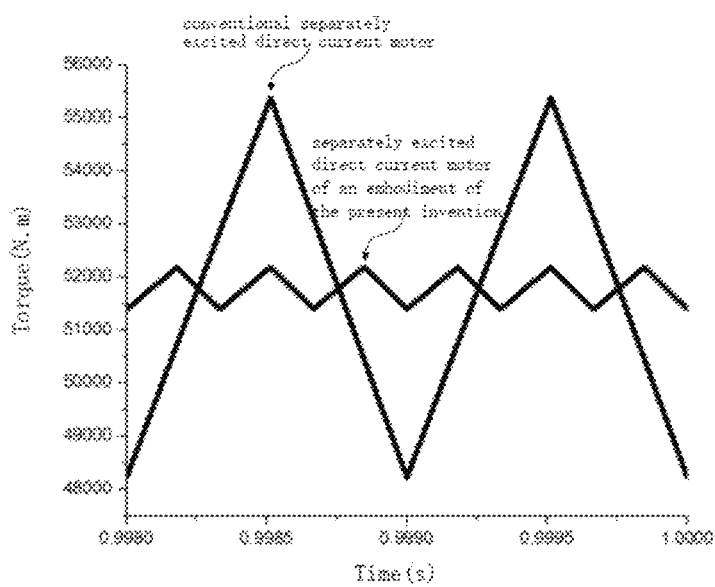
FIG. 45 is a graph comparing the torque of the separately excited direct current motor of Embodiment 5 of the present invention with that of a conventional separately excited direct current motor.

FIG. 40 is a schematic diagram showing circuit connection of a conventional separately excited direct current motor; FIG. 41 is a graph showing input current waveforms of three pairs of brushes of the separately excited direct current motor of Embodiment 5 of the present invention; FIG. 42 is a graph showing input current waveforms of three field winding units of the separately excited direct current motor of Embodiment 5 of the present invention; FIG. 43 is a graph comparing the armature current of the separately excited direct current motor of Embodiment 5 of the present invention with that of a conventional separately excited direct current motor; FIG. 44 is a graph comparing the field current of the separately excited direct current motor of Embodiment 5 of the present invention with that of a conventional separately excited direct current motor; and FIG. 45 is a graph comparing the torque of the separately excited direct current motor of Embodiment 5 of the present invention with that of a conventional separately excited direct current motor.

As shown in FIG. 40, a conventional separately excited direct current motor 600 only has one armature wiring unit and one field wiring unit which are correspondingly electrically connected to two pairs of power output terminals of two choppers (not shown) both having a switching frequency of 1 kHz.

In the steady state, the ripple of the current is the difference between the maximum and minimum values, and the ripple coefficient is the ratio, in terms of percentage, of the difference between the maximum and minimum values to the mean value.

As shown in FIG. 41, for the three pairs of brushes A1B1, A2B2 and A3B3 of the separately excited direct current motor of this embodiment, the ripples of the input currents are all equal to 99.31−87.33=11.99 amperes, the mean values are all equal to 93.32 amperes, and the ripple coefficients are all equal to 11.99/93.32*100%=12.84%.

As shown in FIG. 42, for the three field winding units 1221, 1222 and 1223 of the separately excited direct current motor of this embodiment, the ripples of the input currents are all equal to 61.97−61.37=0.60 amperes, the mean values are all equal to 61.67 amperes, and the ripple coefficients are all equal to 0.60/61.67*100%=0.97%.

As shown in FIG. 43, in the steady state, for the separately excited direct current motor of this embodiment whose armature current equals to the sum of the currents of the three pairs of brushes A1B1, A2B2 and A3B3 in FIG. 41, the ripple of the armature current is equal to 281.95−277.98=3.97 amperes, the mean value is equal to 279.97 amperes, and the ripple coefficient is equal to 3.97/279.97*100%=1.42%. For the conventional separately excited direct current motor, the ripple of the armature current is equal to 297.94−261.98=35.96 amperes, the mean value is equal to 279.97 amperes, and the ripple coefficient is 35.96/279.97*100%=12.84%. Although the mean value of the armature current of the separately excited direct current motor of this embodiment is as same as that of the conventional separately excited direct current motor, the ripple and the ripple coefficient of the armature current of the separately excited direct current motor of this embodiment are only 1/9 of those of the conventional separately excited direct current motor.

As shown in FIG. 44, in the steady state, for the separately excited direct current motor of this embodiment whose field current equals to the sum of the currents of the three field winding units 1221, 1222 and 1223 in FIG. 42, the ripple of the field current is equal to 185.10−184.90=0.2 amperes, the mean value is equal to 185.0 amperes, and the ripple coefficient is equal to 0.2/185*100%=0.11%. For the conventional separately excited direct current motor, the ripple of the field current is equal to 185.9−184.1=1.8 amperes, the mean value is equal to 185.0 amperes, and the ripple coefficient is equal to 1.8/185.0*100%=0.97%. Although the mean value of the field current of the separately excited direct current motor of this embodiment is as same as that of the conventional separately excited direct current motor, the ripple and the ripple coefficient of the field current of the separately excited direct current motor of this embodiment are only 1/9 of those of the conventional separately excited direct current motor.

Given that the electromagnetic torque and motion equations of the separately excited direct current motor are as follows $$\begin{cases} T_{em} = C_T \Phi I_a = L_{af} I_f I_a & (1) \\ T_{em} - T_{load} = J \dfrac{d}{dt} \Omega & (2) \end{cases}$$

where $T_{em}$ is the electromagnetic torque; $C_T$ is the torque constant; $\Phi$ is the magnetic flux of the main magnetic field; $L_{af}$ is the mutual inductance of the field winding part and the armature windings, and is a constant; $I_f$ is the field current; Ia is the armature current; $T_{load}$ is the load torque; J is the load moment of inertia, and is a constant; and $\Omega$ is the output angular velocity.

In this embodiment, the input current of the separately excited direct current motor is equal to the armature current, and the rated input current of the separately excited direct current motor is the maximum input current of the motor in the rated operation state.

In the equation (1), the electromagnetic torque $T_{em}$ is directly proportional to the product of the armature current $I_a$ and the magnetic flux $\Phi$ of the main magnetic field, and the main magnetic field of the direct current motor is excited by the field winding part powered by a chopper. It can be seen from the equation (1) that the electromagnetic torque $T_{em}$ is directly proportional to the product of the armature current $I_a$ and the field current $I_f$, and the ripple coefficient of the field current $I_f$ and the ripple coefficient of the armature current $I_a$ will lead to an increased ripple coefficient of the electromagnetic torque $T_{em}$, and increased pulse or ripple of the output angular velocity $\Omega$, resulting in degradation of performance of the driving device and electric equipment.

In this embodiment, $L_{af}$ takes value of 1, and in the steady state, as shown in FIG. 45, for the separately excited direct current motor of this embodiment, the ripple of the torque of the motor is equal to 52188.25−51398.38=789.87N·m, the mean value is equal to 51793.56 N·m, and the ripple coefficient is equal to 1.53%. For the conventional separately excited direct current motor, the ripple of the torque is equal to 55386.15−48229.93=7156.21 N·m, the mean value is equal to 51798.89 N·m, and the ripple coefficient is equal to 13.82%.

That is to say, although the mean value of the torque of the separately excited direct current motor of this embodiment is as same as that of the conventional separately excited direct current motor, the ripple and the ripple coefficient of the torque of the separately excited direct current motor of this embodiment are only 1/9 of those of the conventional separately excited direct current motor, so that the ripple and the ripple coefficient of the output torque of the motor are reduced, and in turn the ripple and the ripple coefficient of the output speed of the motor are reduced, thereby achieving the purposes of reducing electromagnetic interference, vibration and noises of the motor and improving the performance of the series wound direct current motor and electric equipment.

Function and Effect of Embodiments

According to the direct current motor provided by Embodiments 1 to 5, each pair of main poles includes an S-polarity main pole and an N-polarity main pole, two neighboring main poles are different in polarity, the two brushes in each pair of brushes are arranged at neighboring positions, each pair of brushes includes an S-pole corresponding brush corresponding to the S-polarity main pole, and an N-pole corresponding brush corresponding to the N-polarity main pole, each field winding part includes m field winding units corresponding to the m pairs of main poles, respectively, each field winding unit is made up of field coils formed by winding an insulated conductor strip, which is made of a metal wire coated with an insulating layer, around one pair of main poles corresponding to each other, and m is a positive integer not less than 2, so that each field winding unit is structurally independent and can operate independently, that is: the current in each field winding unit is independent, which allows the current in each field winding unit to be similar to and staggered by 1/m of the switching cycle from one another, so as to reduce both the ripple and the ripple coefficient of the sum of the currents of the m field winding units, i.e. the field current of the motor. Therefore, on the one hand, the motor suffers less electromagnetic interference; on the other hand, the ripple and the ripple coefficient of the main magnetic field formed by the m field winding units are both reduced, so that the ripple and the ripple coefficient of the output torque of the motor are reduced, thus reducing the ripple and the ripple coefficient of the output speed of the motor as well as the vibration and noise of the motor.

Moreover, since the current of each field winding unit is independent, when some field winding units break down, other field winding units can still work normally, and the strength of the magnetic field of corresponding main poles keeps generally constant, so that a large output torque is ensured, and the phenomenon that the conventional direct current motor may suddenly run out of control when a field winding breaks down is prevented, thereby improving the reliability and safety of the system.

Further, since the current of each field winding unit is independent and is 1/m of the current of the field winding part, when the field winding part has a large rated current, the current of each field winding unit can be correspondingly reduced as long as m is large enough, so that the requirements on the contact resistance and insulation of wires and connectors connected to the field winding units are lowered, thereby reducing the cost and difficulties in the production and manufacturing, and improving the cost performance, reliability and safety of the system.

In summary, the direct current motor of this embodiment is simple in structure, uses short connecting lines, and is produced by simple procedures, so that it is easy to manufacture and convenient to maintain, and costs less in both production and maintenance, thus having the advantages of reasonable and simple structure design, high reliability, and high safety. Therefore, the direct current motor is not only applicable to heavy-load electric equipment such as electric vehicles, electric trucks, railcars, tourist cars, trucks and ships, but also applicable to high-performance electric equipment such as numerical control machines and submarines.

Further, in Embodiment 1, each pair of external wiring terminals are connected to a field winding unit and a pair of brushes in series connection, that is: a branch formed by each field winding unit and a pair of brushes correspondingly connected thereto is independent of one another, the current of each branch is also independent, and each branch can operate independently and is independently powered by a corresponding pair of power output terminals, i.e. each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of the m pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the branch formed by each field winding unit and a pair of brushes correspondingly connected thereto is independent, when some power output terminals of the direct current power supply and the brushes and wires of the motor break down, other parts can still work normally, and the magnetic field excited by the field winding units of the parts working normally mainly act on the armature winding branches connected to the corresponding brushes, so that a large output torque is ensured, and the phenomenon that the conventional direct current motor may suddenly run out of control due to the breakdown is prevented, thereby further improving the reliability and safety of the system. Furthermore, since the branch formed by each field winding unit and a pair of brushes correspondingly connected thereto is independent of one another, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

In addition, in Embodiment 2, each pair of external wiring terminals are connected to a field winding unit and a pair of brushes in series connection, that is: a branch formed by each field winding unit and a pair of brushes correspondingly connected thereto is independent of one another, the current of each branch is also independent, and each branch can operate independently and is independently powered by a corresponding pair of power output terminals, i.e. each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of the m pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the branch formed by each field winding unit and a pair of brushes correspondingly connected thereto is independent, when some power output terminals of the direct current power supply and the brushes and wires of the motor break down, other parts can still work normally, and the magnetic field excited by the field winding units of the parts working normally mainly act on the armature winding branches connected to the corresponding brushes, so that a large output torque is ensured, and the phenomenon that the conventional direct current motor may suddenly run out of control due to the breakdown is prevented, thereby further improving the reliability and safety of the system. Furthermore, since the branch formed by each field winding unit and a pair of brushes correspondingly connected thereto is independent of one another, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

Further, in Embodiment 2, each pair of external wiring terminals are connected to a series field winding unit and a pair of brushes, which are firstly connected in series, and a shunt field winding unit, which is then connected in parallel, that is: a branch formed by each series field winding unit and a shunt field winding unit of a pair of brushes correspondingly connected thereto is independent of one another, the current of each branch is also independent, and each branch can operate independently and can be independently powered by a pair of power output terminals of a corresponding direct current power supply, i.e. each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of the m pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the branch formed by each series field winding unit and a shunt field winding unit of a pair of brushes correspondingly connected thereto is independent, when some power output terminals of the direct current power supply and the brushes and wires of the motor break down, other parts can still work normally, and the magnetic field excited by the field winding units of the parts working normally mainly act on the armature winding branches connected to the corresponding brushes, so that a large output torque is ensured, and the phenomenon that the conventional direct current motor may suddenly run out of control due to the breakdown is prevented, thereby further improving the reliability and safety of the system. Furthermore, since the branch formed by each series field winding unit and a shunt field winding unit of a pair of brushes correspondingly connected thereto is independent of one another, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

In addition, in Embodiment 4, each pair of external wiring terminals are connected to a shunt field winding unit and a pair of brushes, which are firstly connected in parallel, and a series field winding unit, which is then connected in series, that is: a branch formed by each shunt field winding unit and a pair of brushes, which are firstly connected in parallel, and a series field winding unit, which is then connected in series, is independent of one another, the current of each branch is also independent, and each branch can operate independently and is independently powered by a corresponding pair of power output terminals, i.e. each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of the m pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the branch formed by each shunt field winding unit and a pair of brushes, which are firstly connected in parallel, and a series field winding unit, which is then connected in series, is independent, when some power output terminals of the direct current power supply and the brushes and wires of the motor break down, other parts can still work normally, and the magnetic field excited by the field winding units of the parts working normally mainly act on the armature winding branches connected to the corresponding brushes, so that a large output torque is ensured, and the phenomenon that the conventional direct current motor may suddenly run out of control due to the breakdown is prevented, thereby further improving the reliability and safety of the system. Furthermore, since the branch formed by each shunt field winding unit and a pair of brushes, which are firstly connected in parallel, and a series field winding unit, which is then connected in series, is independent of one another, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

In addition, in Embodiment 5, each pair of external armature wiring terminals are connected to a pair of brushes, and each pair of external field wiring terminals are connected to a field winding unit, that is: an armature branch formed by each pair of brushes and a field branch formed by each field winding unit are both independent of one another, while each armature branch and each field branch are independent from each other, the current of each branch is also independent, and each branch can operate independently and is independently powered by a corresponding pair of power output terminals, i.e. each pair of power output terminals only bears the working current of one branch, which is 1/m of the rated input current of the motor, so that the output current waveform of each pair of power output terminals of the direct current power supply is similar to and can be staggered by 1/m of the switching cycle from one another, and the ripple and the ripple coefficient of the sum of the currents of the m pairs of brushes, i.e. the armature current of the motor, are further reduced. Therefore, on the one hand, the motor suffers less electromagnetic interference; on the other hand, the ripple and the ripple coefficient of the output torque of the motor are reduced, thus reducing the ripple and the ripple coefficient of the output speed of the motor as well as the vibration and noise of the motor. Besides, since the armature branch formed by each pair of brushes and the field branch formed by each field winding unit are both independent of one another, while each armature branch and each field branch are independent from each other, when some power output terminals of the direct current power supply and the brushes and wires of the motor break down, other parts can still work normally, and the magnetic field excited by the field winding units of the parts working normally mainly act on the armature winding branches connected to the corresponding brushes, so that a large output torque is ensured, and the phenomenon that the conventional direct current motor may suddenly run out of control due to the breakdown is prevented, and the reliability and safety of the system are further improved. Furthermore, since the armature branch formed by each pair of brushes and a field branch formed by each field winding unit are both independent of one another, while each armature branch and each field branch are independent from each other, for a motor with a large rated input current, the working current of each branch or the output current of each pair of power output terminals can be correspondingly reduced as long as m is large enough, so that when the direct current power supply is a chopper or a commutating power supply, the transistor power switch does not needs a power module or parallel current sharing, thereby reducing the cost; and when the direct current power supply is a battery, the number of parallel branches in the battery is reduced, the battery balance problem caused by parallel connection of multiple battery cells is alleviated, the cost for screening to ensure the consistency of the battery cells is reduced, and overall performance degradation resulted from parallel connection of the battery is reduced, thereby improving the energy density, power, performance, durability and safety of the battery are improved.

The foregoing shows and describes the basic principles, main features and advantages of the present invention. It should be understood by those skilled in the art that the present invention is not limited to the above-described embodiments, and that the above-described embodiments and descriptions are merely illustrative of the principles of the invention, and that various changes and modifications may be made thereto without departing from the spirit and scope of the invention, which fall within the scope of the appended claims. The scope of the invention is defined by the appended claims and their equivalents.

The invention claimed is:
1. A direct current motor connected to at least one direct current power supply, comprising:
a casing;
m pairs of brushes fixed within the casing, wherein m is a positive integer greater than 1;
a stator provided within the casing and including m pairs of main poles, each pair of main poles corresponding to one of the m pairs of brushes, and m first field winding units each corresponding to one of the pairs of main poles and to the pair of brushes to which the corresponding pair of main poles corresponds; and
a rotor provided within the stator and including a plurality of armature windings, wherein each pair of main poles includes an S-polarity main pole and an N-polarity main pole neighboring each other in a circumferential direction of the stator,
each of the main poles has a different polarity from neighboring main poles in the circumferential direction of the stator,
each of the pairs of brushes comprises two brushes disposed at neighboring positions in the circumferential direction of the stator,
each pair of brushes includes an S-pole corresponding brush corresponding to the S-polarity main pole of the corresponding pair of main poles and an N-pole corresponding brush corresponding to the N-polarity main pole of the corresponding pair of main poles,
each first field winding unit comprises a first field coil wound around one of the main poles and a second field coil wrapped around the other of the main poles in the corresponding pair of main poles, the direct current motor is connected to m pairs of power output terminals of the at least one direct current power supply, each first field winding unit has a first end connected to one of the brushes of the corresponding pair of brushes and a second end which forms a first wiring terminal, the first end of each first field winding unit is connected to the S-pole corresponding brush of the corresponding pair of brushes, or the first end of each first field winding unit is connected to the N-pole corresponding brush of the corresponding pair of brushes, the other brush of each pair of brushes which is not connected to the first end of the corresponding first field winding unit is connected to a second wiring terminal, for each of the pairs of brushes, the first wiring terminal of the corresponding first field winding unit and the second wiring terminal connected to the other brush of the pair of brushes form a pair of external wiring terminals corresponding to the pair of brushes and to the pair of main poles corresponding to the pair of brushes, the motor having m pairs of external wiring terminals, and each pair of external wiring terminals is for connection to one of the pairs of power output terminals of the at least one direct current power supply in one-to-one correspondence.

2. The direct current motor of claim 1, wherein the motor is connected to a single direct current power supply, and the m pairs of power output terminals are wiring terminals of m power output branches of the direct current power supply.

3. The direct current motor of claim 1, wherein the motor is connected to m direct current power supplies, and the m pairs of power output terminals are wiring terminals of the m direct current power supplies.

4. The direct current motor of claim 1, wherein the first and second field coils of each first field winding unit are connected with each other by any of a series connection and a parallel connection, and the connections of the first and second field coils of all the first field winding units are identical.

5. The direct current motor of claim 1 wherein, the field coils on all the main poles have the same number of turns, and the spatial positions of each pair of main poles correspond to those of the corresponding pair of brushes.

6. The direct current motor of claim 1, further comprising m second field winding units each corresponding to one of the pairs of main poles, each of the second field winding units being wound around the main poles of the corresponding pair of main poles and being connected between the first and second wiring terminals of the pair of external wiring terminals corresponding to the pair of main poles to which the second field winding unit corresponds.

7. The direct current motor of claim 6, wherein each of the first field winding units is a series field winding unit and each of the second field winding units is a shunt field winding unit.

* * * * *